United States Patent
Kim et al.

(10) Patent No.: US 11,240,742 B2
(45) Date of Patent: Feb. 1, 2022

(54) METHOD OF PERFORMING CELL SELECTION AND RE-SELECTION USING PMAX PARAMETERS AND SYSTEM ADAPTED THERETO

(71) Applicant: Samsung Electronics Co., Ltd., Suwon-si (KR)

(72) Inventors: Soenghun Kim, Suwon-si (KR); Sangbum Kim, Suwon-si (KR); Gert-Jan Van Lieshout, Apeldoorn (NL); Jaehyuk Jang, Suwon-si (KR); Taehan Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/102,349

(22) Filed: Nov. 23, 2020

(65) Prior Publication Data

US 2021/0076317 A1    Mar. 11, 2021

Related U.S. Application Data

(63) Continuation of application No. 16/677,426, filed on Nov. 7, 2019, now Pat. No. 10,849,056, which is a (Continued)

(51) Int. Cl.
*H04W 4/00* (2018.01)
*H04W 48/16* (2009.01)
(Continued)

(52) U.S. Cl.
CPC ........... *H04W 48/16* (2013.01); *H04W 48/20* (2013.01); *H04W 52/367* (2013.01)

(58) Field of Classification Search
None
See application file for complete search history.

(56) References Cited

U.S. PATENT DOCUMENTS

2011/0183662 A1   7/2011  Lee et al.
2012/0052903 A1   3/2012  Han et al.
(Continued)

FOREIGN PATENT DOCUMENTS

WO   2010/017012 A1   2/2010
WO   2014/139576 A1   9/2014

OTHER PUBLICATIONS

3GPP TS 36.304 V12.6.0, "3rd Generation Partnership Project; Technical Specification Group Radio Access Network; Evolved Universal Terrestrial Radio Access (E-UTRA); User Equipment (UE) Procedures in Idle Mode (Release 12)", Sep. 2015, 38 pages.

(Continued)

*Primary Examiner* — Suhail Khan

(57) ABSTRACT

The present disclosure relates to a communication method and system for converging a $5^{th}$ Generation (5G) communication system for supporting higher data rates beyond a 4th Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A cell selection/re-selection method and an apparatus adapted thereto is provided. The cell selection method of a terminal includes: receiving, from a base station, first maximum power information, PEMAX1 and second maximum power information, PEMAX2, related to maximum transmission power levels of the terminal on the uplink; calculating a compensation parameter, Pcompensation, related to uplink transmission power of the terminal, using the first maximum power information and the second maximum power information; calculating a cell selection reception level value, Srxlev, using the compensation parameter;

(Continued)

and selecting a cell based on the calculated cell selection reception level value.

16 Claims, 10 Drawing Sheets

Related U.S. Application Data continuation of application No. 16/357,254, filed on Mar. 18, 2019, now Pat. No. 10,602,435, which is a continuation of application No. 15/336,720, filed on Oct. 27, 2016, now Pat. No. 10,237,813.

(60) Provisional application No. 62/246,898, filed on Oct. 27, 2015.

(51) Int. Cl.
*H04W 48/20* (2009.01)
*H04W 52/36* (2009.01)

(56) References Cited

U.S. PATENT DOCUMENTS

| | | | | |
|---|---|---|---|---|
| 2012/0127933 | A1* | 5/2012 | Worrall | H04W 52/367 370/329 |
| 2014/0146680 | A1 | 5/2014 | Wang et al. | |
| 2014/0341059 | A1 | 11/2014 | Jang et al. | |
| 2015/0189657 | A1 | 7/2015 | Kim et al. | |
| 2015/0304969 | A1 | 10/2015 | Morita et al. | |
| 2018/0063800 | A1 | 3/2018 | Zhang et al. | |

OTHER PUBLICATIONS

International Search Report dated Jan. 23, 2017 in connection with International Application No. PCT/KR2016/012185, 12 pages.
Extended European Search Report regarding Application No. 16860254.8, dated May 8, 2018, 9 pages.
Huawei et al., "The usage of PPowerClass in cell reselection", 3GPP TSG-RAN WG2 Meeting #80, R2-125773, Nov. 2012, 2 pages.
Huawei, "Criteria of Cell Reselection from macro cell to HNB", 3GPP TSG RAN2 Meeting #62bis, R2-083517, Jun.-Jul. 2008, 16 pages.
Nokia Corporation et al., "Relationship between the absolute priority reselection mechanism and the legacy reselection rules and parameters", 3GPP TSG-RAN WG2 Meeting #64, R2-086523, Nov. 2008, 7 pages.

\* cited by examiner

METHOD OF PERFORMING CELL SELECTION AND RE-SELECTION USING PMAX PARAMETERS AND SYSTEM ADAPTED THERETO

CROSS-REFERENCE TO RELATED APPLICATIONS

This application is a continuation of U.S. patent application Ser. No. 16/677,426 filed on Nov. 7, 2019, which is a continuation of U.S. patent application Ser. No. 16/357,254 filed on Mar. 18, 2019 now U.S. Pat. No. 10,602,435 issued on Mar. 24, 2020, which is a continuation of U.S. patent application Ser. No. 15/336,720 filed on Oct. 27, 2016 now U.S. Pat. No. 10,237,813 issued on Mar. 19, 2019, which claims priority to U.S. Provisional Patent Application No. 62/246,898 filed on Oct. 27, 2015, the disclosures of which are herein incorporated by reference in their entirety.

BACKGROUND

1. Field

The present invention relates to wireless communication systems, and more particularly, to a method and apparatus for user equipment (UE) to perform the cell selection and re-selection, using $P_{MAX}$ parameters.

2. Description of Related Art

In order to meet the increase in the demand for wireless data traffic after the commercialization of 4G communication systems, considerable effort has been made to develop pre-5G communication systems or improved 5G communication systems. In order to achieve a high data transmission rate, 5G communication systems are being developed to be implemented in a band of extremely high frequency, or millimeter wave (mmWave), e.g., a band of 60 GHz. This is one reason why '5G communication systems' or 'pre-5G communication systems' are called 'beyond 4G network communication systems' or 'post LTE systems.' In order to reduce the occurrence of stray electric waves in a band of extremely high frequency energy and to increase the transmission distance of electric waves in 5G communication systems, various technologies being explored, for example: beamforming, massive MIMO, Full Dimensional MIMO (FD-MIMO), array antennas, analog beam-forming, large scale antennas, etc. In order to improve system networks for 5G communication systems, various technologies have been developed, e.g.: evolved small cell, advanced small cell, cloud radio access network (cloud RAN), ultra-dense network, Device to Device communication (D2D), wireless backhaul, moving network, cooperative communication, Coordinated Multi-Points (CoMP), interference cancellation, etc. In addition, for 5G communication systems, other technologies have been developed, e.g., Hybrid FSK and QAM Modulation (FQAM) and Sliding Window Superposition Coding (SWSC), as Advanced Coding Modulation (ACM), Filter Bank Multi Carrier (FBMC), non-orthogonal multiple access (NOMA), sparse code multiple access (SCMA), etc.

The Internet has evolved from a human-based connection network, where humans create and consume information; to the Internet of Things (IoT) where distributed configurations, such as objects, exchange information with each other to process the information. The technology related to the IoT is starting to be combined with, for example, a technology for processing big data through connection with a cloud server, and this is called an Internet of Everything (IoE) technology. In order to manifest the IoT, various technical components are required, such as, a sensing technology, wired/wireless communication and network infra technology, a service interfacing technology, a security technology, etc. In recent years, a sensor network for connecting objects, Machine to Machine (M2M), Machine Type Communication (MTC), etc. have been researched. Under the IoT environment, intelligent Internet Technology (IT) services may be provided to collect and analyze data obtained from objects connected to each other and thus to create new value for human life. As existing IT technologies are fused and combined with various industries, the IoT may also be applied within various fields, such as: smart homes, smart buildings, smart cities, smart cars or connected cars, smart grids, health care, smart home appliances, high quality medical services, etc.

To this end, various attempts have been made to apply 5G communication systems to the IoT. For example, various technologies related to sensor networks, Machine to Machine (M2M), Machine Type Communication (MTC), etc., have been implemented by beam-forming, MIMO, array antenna, etc., as 5G communication technology. The application of the cloud RAN as a big data processing technology described above may be an example of a hybrid of 5G technology and IoT technology.

As such, in order to meet the increase in the demand for wireless data traffic, research has been undertaken to develop communication systems in various technical fields. Examples of the communication systems are device to device (D2D) communication, a carrier aggregation system for operating a number of cells, a multiple antenna system using large scale antennas, etc.

SUMMARY

To address the above-discussed deficiencies, it is a primary object to provide a method and apparatus that enables user equipment (UE) to perform the cell selection and re-selection using a number of PMAX parameters.

The present invention further provides a method and apparatus for increasing the reliability of a Semi-Persistent Scheduling (SPS) activation signal and an SPS deactivation signal in the shared SPS operation.

In accordance with an aspect of the present invention, a cell selection method of a terminal is provided. The method includes: receiving, from a base station, first maximum power information, PEMAX1, and second maximum power information, PEMAX2, related to the maximum transmission power level of the terminal on the uplink; calculating a compensation parameter, Pcompensation, related to uplink transmission power of the terminal, using the first maximum power information and the second maximum power information; calculating a cell selection reception level value, Srxlev, using the compensation parameter; and selecting a cell based on the calculated cell selection reception level value.

Preferably, the first maximum power information and the second maximum power information is contained in system information transmitted from the base station.

Preferably, the compensation parameter is calculated by the following Equation 1:

$$P\text{compensation}=\max(P\text{EMAX1}-P\text{PowerClass},0)-\{\min(P\text{EMAX2},P\text{PowerClass})-\min(P\text{EMAX1},P\text{PowerClass})\} \quad \text{Equation (1)}$$

where Pcompensation denotes the compensation parameter, PEMAX1 denotes the first maximum power information, PEMAX2 denotes the second maximum power information, and PPowerClass denotes the maximum RF output power of the terminal.

Preferably, the cell selection reception level value, Srxlev, is calculated by the following Equation 2:

$$Srxlev = Qrxlevmeas - (Qrxlevmin + Qrxlevminoffset) - Pcompensation \quad \text{Equation (2)}$$

where Srxlev denotes cell selection reception level value, Qrxlevmeas denotes a measured received strength value, and Qrxlevminoffset denotes a power offset value for base stations with priority.

Preferably, selecting a cell includes: periodically selecting a cell, based on the calculated cell selection reception level value, to discover a public land mobile network (PLMN) with high priority.

Preferably, the first maximum power information is a value used by a terminal that does not support a number of frequency bands, and the second maximum power information corresponds to at least one of a number of frequency bands supported by the terminal.

In accordance with another aspect of the present invention, a terminal configured to perform the cell selection is provided. The terminal includes: a transceiver for performing the transmission/reception of signals; and a controller for: controlling the transceiver to receive, from a base station, first maximum power information, PEMAX1, and second maximum power information, PEMAX2, related to the maximum transmission power level of the terminal on the uplink; calculating a compensation parameter, Pcompensation, related to uplink transmission power of the terminal, using the first maximum power information and the second maximum power information; calculating a cell selection reception level value, Srxlev, using the compensation parameter; and selecting a cell based on the calculated cell selection reception level value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

Although the following disclosure describes embodiments of the present invention based on Long Term Evolution (LTE) defined in the specification of 3GPP, it should be understood that the subject matter of the present invention can also be applied to other communication systems that have similar technical backgrounds to the present invention. It will be also appreciated to those skilled in the art that the embodiments may be modified and the modifications may also be applied to other communication systems, without departing from the scope of the present invention.

In the following description, LTE system and carrier aggregation are briefly explained.

Figure 1:
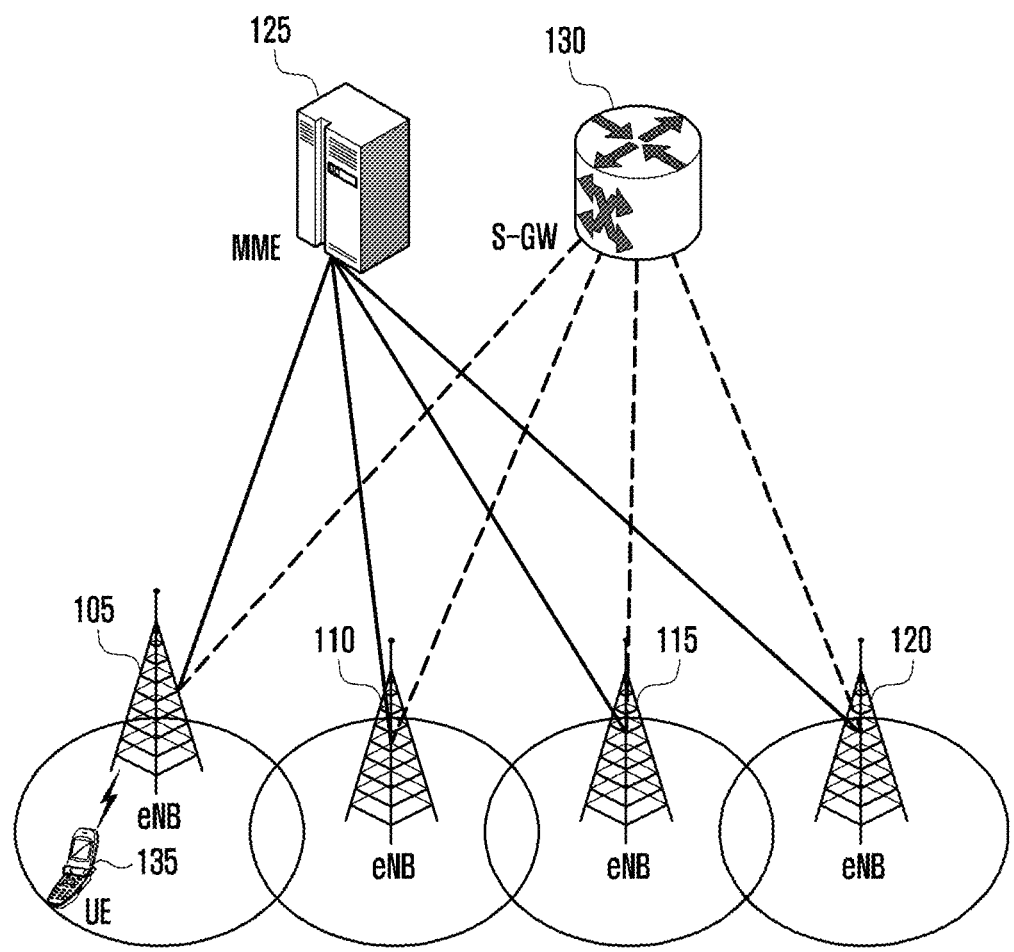
FIG. 1 illustrates a configuration of an LTE system according to an embodiment of the present invention.

FIG. 1 illustrates a configuration of an LTE system according to an embodiment of the present invention.

With reference to FIG. 1, the LTE system configures the wireless access network, including evolved Node Bs (called eNBs, Node Bs or base stations) 105, 110, 115, and 120, a mobility management entity (MME) 125, and a serving-gateway (S-GW) 130. User equipment (UE) (which is also called a terminal) 135 is connected to an external network via the eNB 105, 110, 115, or 120 and the S-GW 130.

eNBs 105 to 120 correspond to existing Node B of the Universal Mobile Telecommunications System (UMTS).

eNBs 105 to 120 are connected to UE 135 via wireless channels, performing more complicated functions than existing Node B.

In an LTE system, since real-time services such as a Voice over IP (VoIP) service and all user traffic are serviced via shared channels, devices are required to collect information regarding states, such as buffer states of UE devices, available transmission power states, channel states, etc., and to make a schedule. This task is performed via eNBs 105 to 120.

One eNB controls a number of cells. For example, in order to implement a transmission rate of 100 Mbps, an LTE system employs orthogonal frequency division multiplexing (OFDM) as a wireless access technology at a bandwidth of 20 MHz. It also employs adaptive modulation & coding (AMC) to determine modulation scheme and channel coding rate, meeting with the channel state of UE.

The S-GW 130 is an entity that provides data bearers. The S-GW 130 establishes or removes data bearers according to the control of the MME 125. The MME 125 manages the mobility of UE and controls a variety of functions. The MME 125 connects to a number of ENBs.

Figure 2:
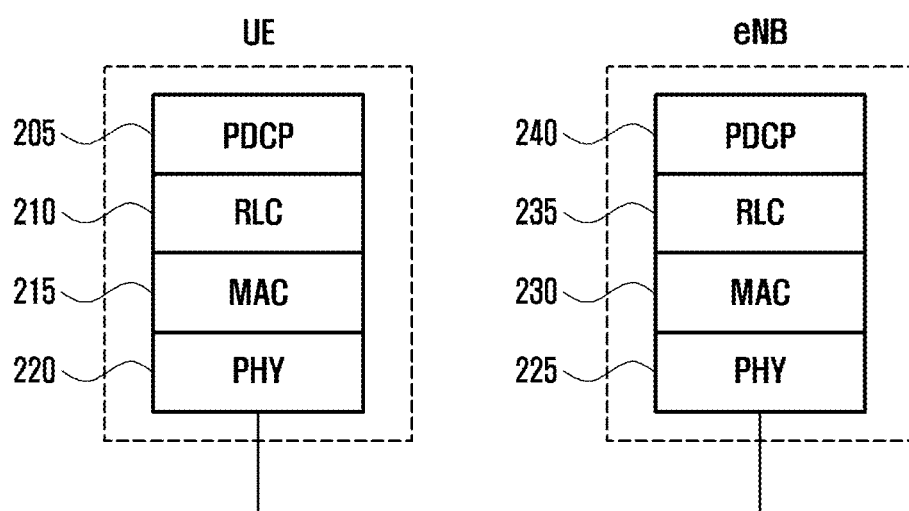
FIG. 2 illustrates a radio protocol stack in an LTE system according to embodiments of the present invention.

FIG. 2 illustrates a radio protocol stack in an LTE system according to embodiments of the present invention.

With reference to FIG. 2, UE and eNB have packet data convergence protocol (PDCP) 205 and 240, radio link control (RLC) 210 and 235, and medium access control (MAC) 215 and 230, respectively. PDCP 205 and 240 compress/decompress the IP header. RLC 210 and 235 reconfigure PDCP packet data unit (PDU) in proper size and perform an automatic repeat request (ARQ) operation.

MAC 215 and 230 connect to a number of RLC layer devices configured in one UE device. MAC 215 and 230 multiplex RLC PUDs to MAC PDU, and de-multiplex RLC PDUs from MAC PDU. Physical layers (PHY) 220 and 225 in UE and eNB channel-code and modulate data from the upper layers, create OFDM symbols, and transmit them via a wireless channel. In addition, PHY 220 and 225 demodulate and channel-decode OFDM symbols transmitted via a wireless channel, and transfer them to the upper layers.

In some embodiments, user equipment (UE) enables to perform the cell selection and re-selection using a number of PMAX parameters.

In LTE communication systems, the mobility of UE are divided into a type of mobility according to an instruction of eNB and a type of mobility that UE determines for itself. UE controls the UE' mobility for itself in an idle state, i.e., performs the cell selection and cell re-selection. A process of UE to select/re-select a cell is also expressed as UE camps on a corresponding cell. UE is capable of determining whether it may camp on a corresponding cell, considering the downlink signal strength, the uplink transmission power of a cell, etc.

With the development of hardware/software and the radio frequency (RF) technology of UE, UE is capable of satisfying the spectrum emission standard requiring a relatively large amount of transmission power. For example, in order to satisfy a specified emission standard, legacy UE has used transmission power of a maximum of 17 dBm. New UE is capable of satisfying the emission standard using transmission power of 23 dBm.

When UE 1 maintaining a relatively low level of transmission power and UE 2 capable of using a relatively high level of transmission power coexist in a cell in order to satisfy the emission output standard, the present invention is capable of applying corresponding maximum levels of transmission power that differ from each other to the two UE devices respectively.

The present invention transmits, to UE, a number of levels of uplink maximum transmission power, $P_{MAX}$, allowed in a cell, so that the UE selects one of the levels of $P_{MAX}$, based on the UE's condition.

In particular, when UE: determines whether it camps on a specified cell; or detects a minimum fitness of using a neighboring cell and a serving cell in the cell re-selection (considering both the allowed uplink transmission power and the received strength of the downlink reference signal, which is denoted by Srxlevmin), the UE is capable of selecting part of a number of $P_{MAX}$ parameters. The UE is capable of camping on a proper cell based on the selected $P_{MAX}$ parameters.

In some embodiments, following steps are included.

Figure 3:
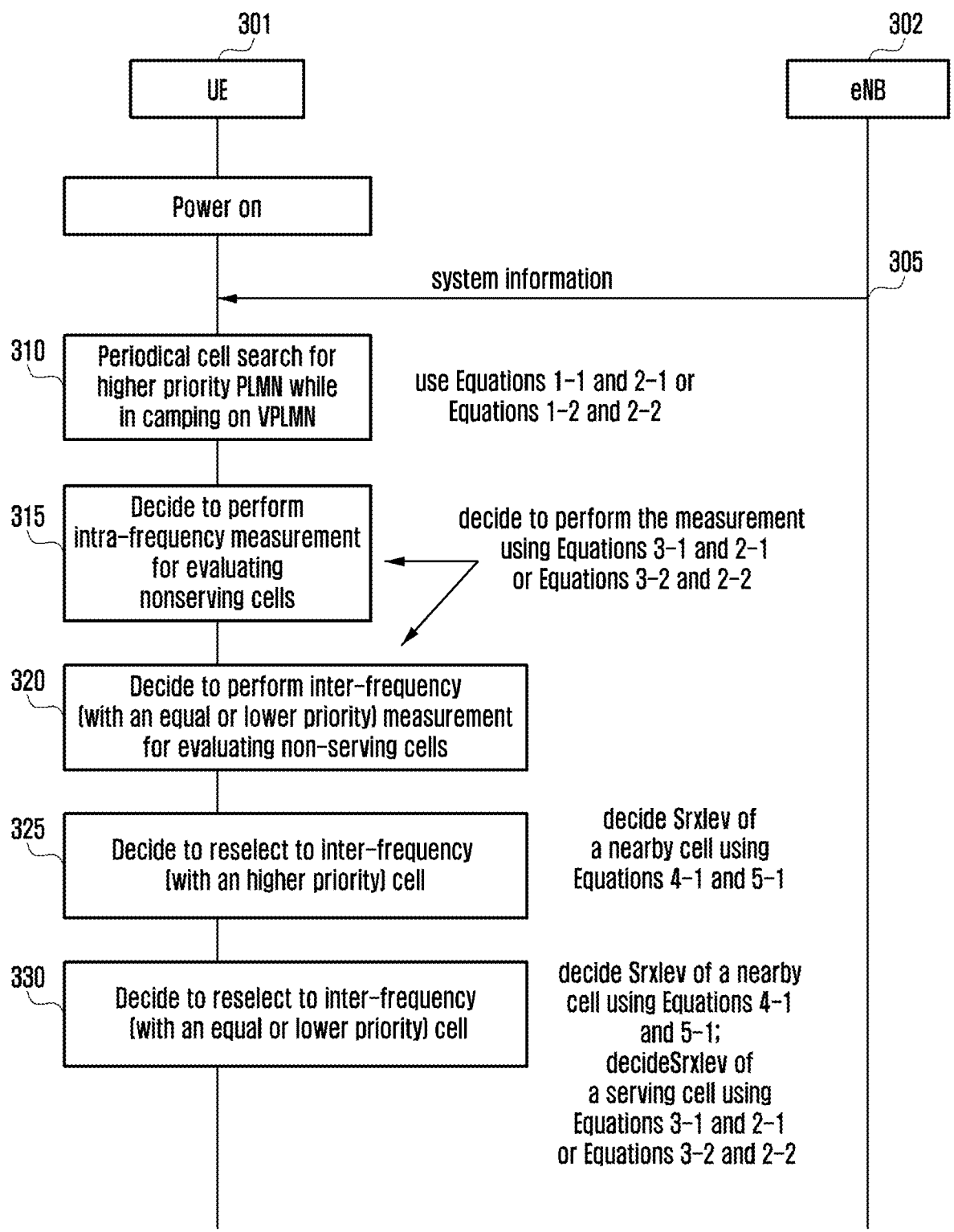
FIG. 3 illustrates a flow diagram of operations between UE and eNB according to embodiment of the present invention.

1. Periodic cell selection $Q_{rxlevmin,SIB1}$ and Pcompensation are used to calculate Srxlev; and $P_{EMAX,SIB1}$, $P_{EMAX,SIB2}$, and $P_{PowerClass}$ are used to calculate Pcompensation; or $Q_{rxlevmin,SIB2}$ and Pcompensation are used to calculate Srxlev; and $P_{PowerClass}$ and one of $P_{EMAX,SIB1}$ and $P_{EMAX,SIB2}$ are used to calculate Pcompensation 2-1. Determination as to whether to measure an intra-frequency non-serving cell for the cell re-selection; or 2-2. Determination as to whether to measure an inter-frequency with equal or lower priority non-serving cell for the cell re-selection; or 2-3. In order to determine whether to perform the cell re-selection to the inter-frequency with higher priority non-serving cell $Q_{rxlevmin,SIB1}$ and Pcompensation are used to calculate Srxlev of a serving cell; and $P_{EMAX\ SIB1}$, $P_{EMAX,SIB2}$, and $P_{PowerClass}$ are used to calculate Pcompensation;

$Q_{rxlevmin,SIB2}$ and Pcompensation are used to calculate Srxlev of a serving cell; and $P_{Power\ Class}$ and one of $P_{EMAX,SIB1}$ and $P_{EMAX,SIB2}$ are used to calculate Pcompensation; or $Q_{rxlevmin,SIB5}$ and Pcompensation are used to calculate Srxlev of a non-serving cell; and $P_{EMAX,\ SIB5}$ and $P_{PowerClass}$ are used to calculate Pcompensation FIG. 3 illustrates a flow diagram of operations between UE and eNB according to embodiment of the present invention.

In a mobile communication system configured with UE 301 and eNB/cell 302, UE 301 in an idle state receives system information in a cell in operation 305. The system information may contain information regarding a number of levels of $P_{MAX}$.

Pmax_SIB1: Pmax broadcast via SIB1. Only one Pmax_SIB1 is within one cell.

Pmax_SIB2: Pmax broadcast via SIB2. A number of Pmax_SIB2 may be within one cell.

Pmax_SIB5: Pmax broadcast via SIB5. A number of Pmax_SIB5 may be within one cell.

UE 301 performs the periodic cell selection, part of the processes of searching for a higher priority PLMN, in operation 310. In this case, UE 301 calculates the use fitness (Srxlevmin) of a serving cell as in the following Equation 1-1. TABLE 1 shows some parameters indicated in Equation 1-1.

$$Srxlev = Q_{rxlevmeas} - (Q_{rxlevmin,SIB1} + Q_{rxlevminoffset}) - Pcompensation \qquad \text{Equation 1-1}$$

TABLE 1

| | |
|---|---|
| Srxlev | Cell selection RX level value (dB) |
| $Q_{rxlevmeas}$ | Measured cell RX level value (RSRP) |
| $Q_{rxlevmin, SIB1}$ | Minimum required RX level in the cell (dBm) Three different values are provided via SIB1, SIB3, and SIB5. A value, obtained from the equation, via SIB 1, is used. |
| $Q_{rxlevminoffset}$ | Offset to the signalled $Q_{rxlevmin}$ taken into account in the Srxlev evaluation as a result of a periodic search for a higher priority PLMN while camped normally in a VPLMN [23.122] |
| $P_{EMAX, SIB1}$ | Maximum TX power level an UE may use when transmitting on the uplink in the cell (dBm) defined as $P_{EMAX}$ in [TS 36.101] A value, obtained via SIB 1 and used by UE that does not support multiple band. |
| $P_{EMAX, SIB2}$ | Maximum TX power level an UE may use when transmitting on the uplink in the cell (dBm) defined as $P_{EMAX}$ in [TS 36.101] A number of pairs are obtained via SIB2. One maximum per Frequency Band. UE uses, as $P_{EMAX, SIB2}$, $P_{EMAX}$ corresponding to a band with the highest priority from among the bands that the UE supports |
| $P_{PowerClass}$ | Maximum RF output power of the UE (dBm) according to the UE power class as defined in [TS 36.101] |

$$\text{Srxlev} = Q_{rxlevmeas} - (Q_{rxlevmin,x} + Q_{rxlevminoffset}) - P\text{compensation} \quad \text{Equation 1-2}$$

In the equation 1-2, when $Q_{rxlevmin,SIB2}$ is not broadcast in the serving cell (or UE supports none of $Q_{rxlevmin,SIB2}$ in the serving cell), $Q_{rxlevmin,X}$ is $Q_{rxlevmin,SIB1}$. When UE supports at least one of $Q_{rxlevmin,SIB2}$ in the serving cell, $Q_{rxlevmin,X}$ is $Q_{rxlevmin,SIB2}$. TABLE 2 shows a parameter indicated in Equation 1-2.

TABLE 2

| | |
|---|---|
| $Q_{rxlevmin, SIB2}$ | Minimum required RX level in the cell (dBm). A number of pairs are obtained via SIB2. One maximum per Frequency Band. UE uses, as $P_{EMAX, SIB2}$, Qrxlevmin, SIB2 corresponding to a band with the highest priority from among the bands that the UE supports |

$$P\text{compensation} = \max(P_{EMAX,SIB1} - P_{PowerClass}, 0) - [\min(P_{EMAX,SIB2}, P_{PowerClass}) - \min(P_{EMAX,SIB1}, P_{PowerClass})] \quad \text{Equation 2-1}$$

In the equation 2-1, when $P_{EMAX,SIB2}$ is not broadcast in the serving cell (or UE does not support none of $P_{EMAX,SIB2}$ in the serving cell), $P_{EMAX,SIB2}$ is 0.

$$P\text{compensation} = \max(P_{EMAX,X} - P_{PowerClass}, 0) \quad \text{Equation 2-2}$$

In the equation 2-2, when $P_{EMAX,SIB2}$ is not broadcast in the serving cell (or UE does not support none of $P_{EMAX,SIB2}$ in the serving cell), $P_{EMAX,X}$ is $P_{EMAX,SIB1}$. When UE supports at least one of $P_{EMAX,SIB2}$ in the serving cell, $P_{EMAX,X}$ is $P_{EMAX,SIB2}$.

In the periodic cell selection, Equations 1-1 and 2-1 or Equations 1-2 and 2-2 are used to calculate the cell fitness. In some embodiments of Equation 2-1, Pcompensation is negative in a cell where $P_{PowerClass} > P_{EMAX,SIB2}$, and a relatively high level of cell fitness for the same Qrxlevmeas is calculated, thereby resulting in the extension of coverage, Pcompensation is negative in a cell where $P_{EMAX,SIB2} > P_{PowerClass} > P_{EMAX,SIB1}$, resulting in the extension of coverage. The extent of the extension of coverage is less than that of the first case described above, and Pcompensation is positive when $P_{PowerClass} < P_{EMAX, SIB1}$, thereby resulting in the reduction of coverage.

When Srxlev of a serving cell is greater than '0' and Squal is greater than '0,' the UE 301 considers the serving cell to be a selectable cell. When there is a PLMN cell satisfying the conditions from among PLMN cells with higher priority, the UE selects the cell.

The UE 301 is capable of measuring intra-frequency neighboring cells to perform the cell re-selection, while performing the periodic cell selection, in operation 315. When the UE 301 ascertains that the following condition is satisfied, it is capable of measuring the intra-frequency neighboring cells.

When the serving cell satisfies the conditions, $\text{Srxlev} > S_{IntraSearchP}$ and $\text{Squal} > S_{IntraSearchQ}$, the UE 301 may choose not to perform the measurement of intra-frequency neighboring cells.

Otherwise, the UE may perform the measurement of intra-frequency neighboring cells. $S_{IntraSearchP}$ and $S_{IntraSearchQ}$ are provided via system information of a serving cell. The UE 301 calculates Srxlev of a serving cell by using either Equations 3-1 and 2-1 or Equations 3-2 and 2-2 as follows:

$$\text{Srxlev} = Q_{rxlevmeas} - Q_{rxlevmin,SIB1} - P\text{compensation} \quad \text{Equation 3-1}$$

$$\text{Srxlev} = Q_{rxlevmeas} - Q_{rxlevmin,SIB2} - P\text{compensation} \quad \text{Equation 3-2}$$

The UE 301 is capable of performing the inter-frequency measurement for the cell re-selection. The inter-frequency measurement by the UE 301 is controlled by the cell re-selection priority (also called the priority).

With respect to a frequency with a priority higher than that of a current serving cell/frequency, the UE 301 performs the periodic measurement for neighboring cells. On the other hand, with respect to a frequency with a priority less than or equal to that of a current serving cell/frequency, the UE 301 performs the measurement for neighboring cells only when a specified condition is satisfied.

More specifically, the UE 301 determines whether the UE 301 measures neighboring cells whose frequency has a priority less than or equal to that of a serving cell/frequency, based on the following conditions in operation 320.

If the serving cell fulfils $\text{Srxlev} > S_{nonIntraSearchP}$ and $\text{Squal} > S_{nonIntraSearchQ}$, the UE may choose not to perform measurements of E-UTRAN inter-frequencies or inter-RAT frequency cells of equal or lower priority.

Otherwise, the UE shall perform measurements of E-UTRAN inter-frequencies or inter-RAT frequency cells of equal or lower priority according to [10].

The UE 301 calculates Srxlev of a serving cell by using either Equations 3-1 and 2-1 or Equations 3-2 and Equation 2-2.

When the UE 301 ascertains that a cell re-selection condition is satisfied from the neighboring cell measurement result, the UE 301 re-selects a new cell. When the UE 301 ascertains that the following condition is satisfied, the UE 301 re-selects a neighboring cell with a higher priority in operation 325. The cell re-selection to a cell on a higher priority E-UTRAN frequency or inter-RAT frequency than the serving frequency shall be performed if:

A cell of a higher priority RAT/frequency fulfils $\text{Srxlev} > \text{Thresh}_{X,HighP}$ during a time interval $\text{Treselection}_{RAT}$; and More than 1 second has elapsed since the UE camped on the current serving cell.

The UE 301 calculates Srxlev of a neighboring cell under the conditions, by using Equations 4-1 and 5-1 as follows:

$$Srxlev = Q_{rxlevmeas} - Q_{rxlevmin,SIB5} - Pcompensation \quad \text{Equation 4-1}$$

$$Pcompensation = \max(P_{EMAX,SIB5} - P_{PowerClass}, 0) \quad \text{Equation 5-1}$$

$P_{EMAX,SIB5}$ is values each of which is signalled per frequency via SIB5. When $P_{EMAX,SIB5}$ is not signalled for a frequency, UE uses $P_{PowerClass}$ as $P_{EMAX,SIB5}$ of the frequency.

When the UE 301 ascertains that the following condition is satisfied, the UE 301 re-selects a cell with a priority less than or equal to that of a serving cell/frequency in operation 330.

The serving cell fulfils $Srxlev < Thresh_{Serving, LowP}$ and a cell of a lower priority RAT/frequency fulfils $Srxlev > Thresh_{X,LowP}$ during a time interval $Treslection_{RAT}$; and More than 1 second has elapsed since the UE camped on the current serving cell.

The UE 301 calculates Srxlev of a neighboring cell by using Equations 4-1 and 5-1, and also Srxlev of a serving cell by using either Equations 3-1 and 2-1 or Equations 3-2 and 2-2.

Figure 4:
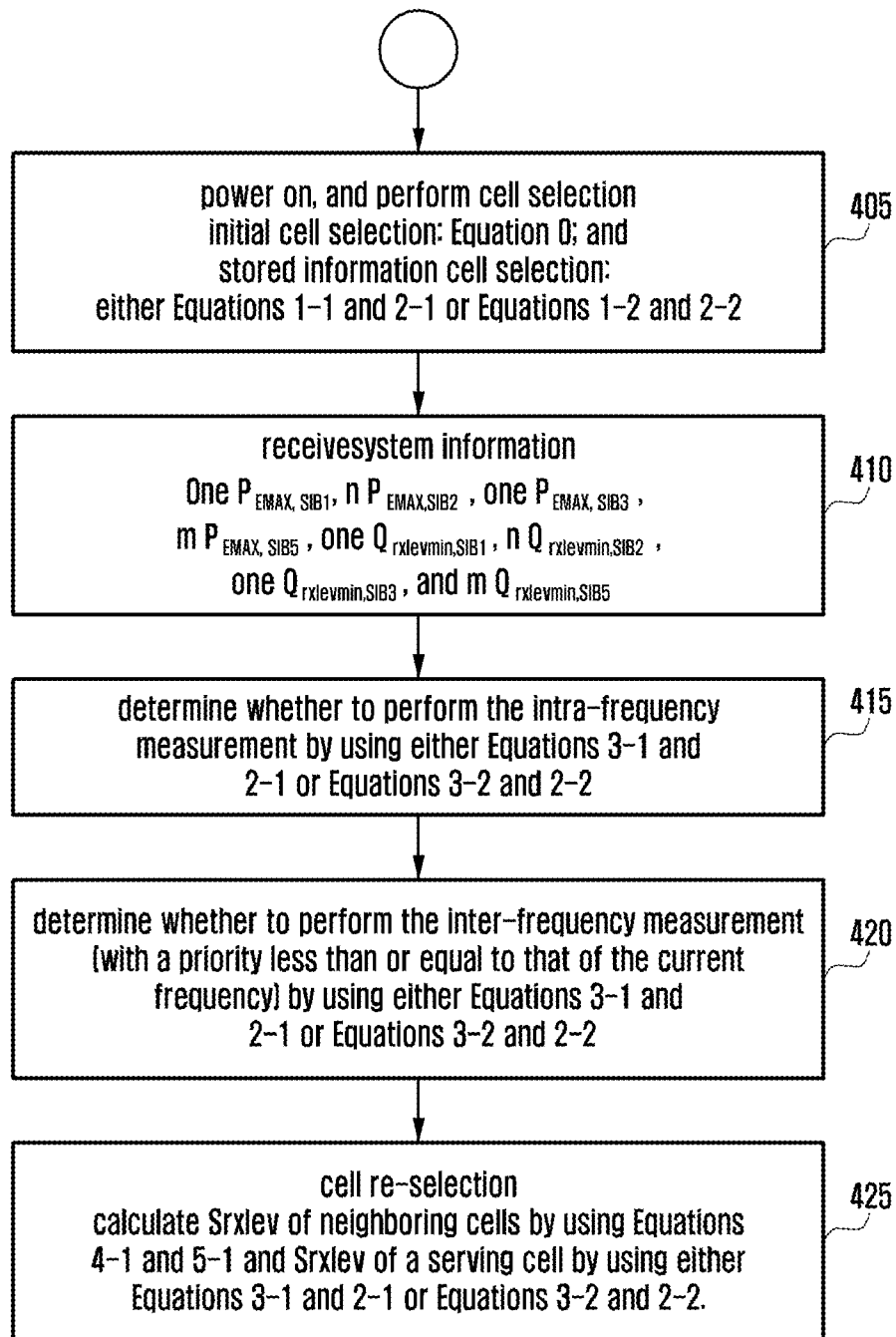
FIG. 4 illustrates a flowchart of a method for UE to perform a cell selection or re-selection according to embodiment of the present invention.

FIG. 4 illustrates a flowchart of a method for UE to perform the cell selection or re-selection according to embodiment of the present invention.

A UE is powered on and performs the cell selection in operation 405.

When the UE has stored valid system information, the UE performs the stored information cell selection. Otherwise, the UE performs the initial cell selection.

In the initial cell selection, the UE calculates Srxlev by using Equation 6 as follows.

$$Srxlev = Qrxlevmeas - Qrxlevmin, ini \quad \text{Equation (6)}$$

Qrxlevmin,ini is a value defined in the specification. It is used when the UE does not obtain system information regarding a corresponding cell.

In the stored information cell selection, the UE calculates Srxlev by using either Equations 1-1 and 2-1 or Equations 1-2 and 2-2.

The UE selects a cell whose Srxlev and Squal are greater than or equal to '0,' and camps on the cell.

The UE receives system information regarding the selected cell, and obtains the following parameters in operation 410.

One $P_{EMAX, SIB1}$, n $P_{EMAX,SIB2}$, one $P_{EMAX, SIB3}$, m $P_{EMAX, SIB5}$, one $Q_{rxlevmin,SIB1}$, n $Q_{rxlevmin,SIB2}$, one $Q_{rxlevmin,SIB3}$ and m $Q_{rxlevmin,SIB5}$, where m and n are positive integers.

n is related to the number of frequency bands supported by a corresponding serving cell. When the number of frequency bands supported by a corresponding serving cell is n', n and n' has a relationship, n≤n'.

m is related to the number of inter-frequency bands provided via SIB5. When the number of inter-frequency bands provided via SIB5 is m', m and m' has a relationship, m≤m'.

The UE determines whether the UE measures neighbouring cells of the same frequency, considering Srxlev of a current serving cell in operation 415. UE calculates Srxlev of a serving cell by using either Equations 3-1 and 2-1 or Equations 3-2 and 2-2.

The UE determines whether the UE searches for neighboring cells of another frequency in operation 420. The other frequency means not all frequencies except for the current frequency but only a frequency that is related to information provided via SIB5.

The UE performs the periodic measurement for frequencies with a priority higher than that of the current frequency. UE determines whether the UE performs the measurement for frequencies with a priority less than or equal to that of the current frequency, considering Srxlev of a serving cell.

The UE calculates Srxlev of a serving cell by using either Equations 3-1 and 2-1 or Equations 3-2 and 2-2.

When the UE ascertains that a specified condition is satisfied, the UE re-selects a new cell in operation 425. When UE re-selects a cell with high priority, the UE calculates Srxlev of neighboring cells by using Equations 4-1 and 5-1.

When the UE re-selects a cell with priority less than or equal to that of a serving cell/frequency, the UE calculates Srxlev of neighboring cells by using Equations 4-1 and 5-1, and Srxlev of a serving cell by using either Equations 3-1 and 2-1 or Equations 3-2 and 2-2.

Using Equations 1-1 and 2-1 to calculate Srxlev of a serving cell means that: Srxlev of a serving cell is calculated by using $Q_{rxlevmin,SIB1}$ and Pcompensation; and Pcompensation is calculated by using $P_{EMAX, SIB1}$, $P_{EMAX,SIB2}$, and $P_{PowerClass}$.

Using Equations 1-2 and 2-2 to calculate Srxlev of a serving cell means that: Srxlev of a serving cell is calculated by using Pcompensation and either $Q_{rxlevmin,SIB2}$ or $Q_{rxlevmin,SIB1}$; and Pcompensation is calculated by using $P_{PowerClass}$ and either $P_{EMAX, SIB1}$ or $P_{EMAX,SIB2}$.

Using Equations 3-1 and 2-1 to calculate Srxlev of a serving cell means that: Srxlev of a serving cell is calculated by using $Q_{rxlevmin,SIB1}$ and Pcompensation; and Pcompensation is calculated by using $P_{EMAX, SIB1}$, $P_{EMAX,SIB2}$, and $P_{PowerClass}$.

Using Equations 3-2 and 2-2 to calculate Srxlev of a serving cell means that: Srxlev of a serving cell is calculated by using $Q_{rxlevmin,SIB2}$ and Pcompensation; and Pcompensation is calculated by using $P_{PowerClass}$ and either $P_{EMAX, SIB1}$ or $P_{EMAX,SIB2}$.

Using Equations 4-1 and 5-1 to calculate Srxlev of a neighboring cell means that: Srxlev of a corresponding cell is calculated by using $Q_{rxlevmin,SIB5}$ and Pcompensation; and Pcompensation is calculated by using $P_{EMAX, SIB5}$ and $P_{PowerClass}$.

Figure 5:
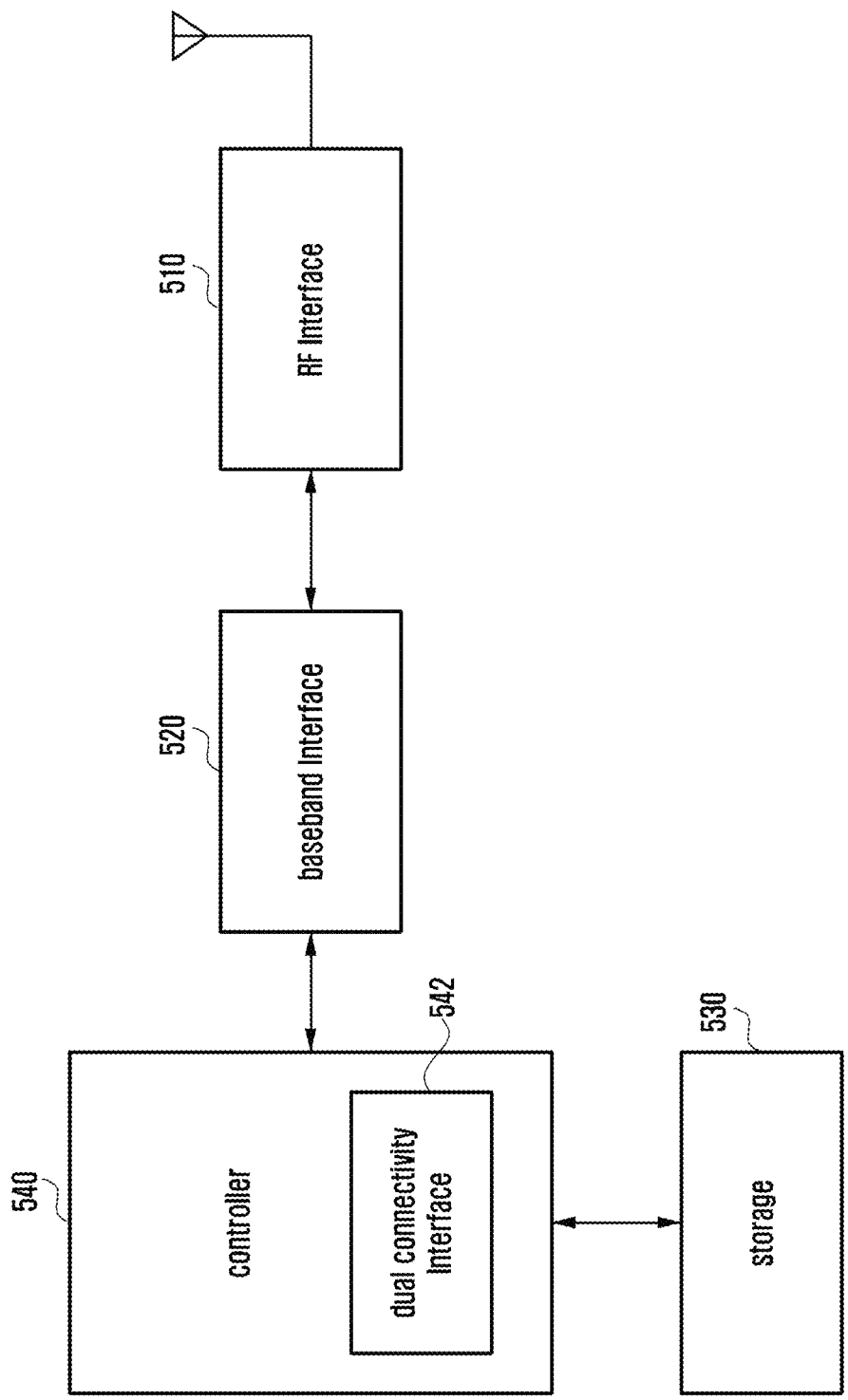
FIG. 5 illustrates a configuration of UE according to embodiments of the present invention.

FIG. 5 illustrates a configuration of UE according to embodiments of the present invention.

With reference to FIG. 5, UE includes a Radio Frequency (RF) interface 510, a baseband interface 520, a storage 530, and a controller 540.

The RF interface 510 performs functions relates to the transmission/reception of signals via a wireless channel, e.g., the conversion of frequency band, the amplification, etc. The RF interface 510 up-converts baseband signals output from the baseband interface 520 into RF band signals and transmits the RF signals via an antenna. The RF interface 510 down-converts RF band signals received via the antenna into baseband signals.

The RF interface 510 is capable of including a transmission filter, a reception filter, an amplifier, a mixer, an oscillator, a digital to analog convertor (DAC), an analog to digital convertor (ADC), etc.

Although the embodiment is shown in FIG. 5 so that UE includes only one antenna, it should be understood that the UE may be implemented to include a number of antennas. The RF interface 510 may also be implemented to include a number of RF chains. The RF interface 510 is capable of performing a beamforming operation.

In order to perform a beamforming function, the RF interface 510 is capable of adjusting the phase and amplitude of individual signals transmitted/received via a number of antennas or antenna elements. The RF interface 510 is capable of performing MIMO and receiving a number of layers in MIMO.

The baseband interface 520 performs the conversion between baseband signals and bitstream according to a physical layer rule of the system. For example, in data transmission, the baseband interface 520 encodes and modulates a transmission bitstream, thereby creating complex symbols.

In the data reception, the baseband interface 520 demodulates and decodes baseband signals output from the RF interface 510, thereby restoring a reception bitstream. For example, in data transmission according to the orthogonal frequency division multiplexing (OFDM), the baseband interface 520 encodes and modulates a transmission bitstream to create complex symbols, maps the complex symbols to sub-carriers, and configures OFDM symbols through the inverse fast Fourier transform (IFFT) operation and the cyclic prefix (CP) insertion.

In the data reception, the baseband interface 520 splits baseband signals output from the RF interface 510 into OFDM symbol units, restores signals mapped to sub-carriers through the fast Fourier transform (FFT) operation, and then restores a reception bitstream through the demodulation and decoding operation.

The baseband interface 520 and the RF interface 510 perform the transmission and reception of signals as described above. Accordingly, the baseband interface 520 and the RF interface 510 may also be called a transmitter, a receiver, a transceiver, a communication interface, etc.

In addition, the baseband interface 520 and/or the RF interface 510 may include a number of communication modules to support wireless access technologies that differ from each other. Alternatively, the baseband interface 520 and/or the RF interface 510 may include different communication modules to process signals of different frequency bands.

Examples of the wireless access technologies are: wireless LAN (e.g., IEEE 802.11), a cellular network (e.g., LTE), etc. Examples of the different frequency bands are: super high frequency (SHF) (e.g., 2.5 GHz band, 5 GHz band, etc.), millimeter wave (mmW) (e.g., 60 GHz band), etc.

The storage 530 stores a default program for operating the UE, applications, settings, data, etc. In particular, the storage 530 is capable of storing information related to a second access node which performs wireless communication using a second wireless access technology. The storage 530 provides the stored data according to the request of the controller 540.

The controller 540 controls all operations of the UE. For example, the controller 540 controls the baseband interface 520 and the RF interface 510 to perform the transmission/reception of signals. The controller 540 controls the storage 540 to store/read data therein/therefrom. the controller 540 may be a circuit, an application-specific integrated circuit or at least one processor.

To this end, the controller 540 is capable of including at least one processor. For example, the controller 540 is capable of including a communication processor (CP) for controlling the communication and an application processor (AP) for controlling upper layers such as applications. According to embodiments of the present invention, the controller 540 is capable of controlling the UE to perform the functions and the procedure described above referring to FIGS. 3 and 4.

Figure 6:
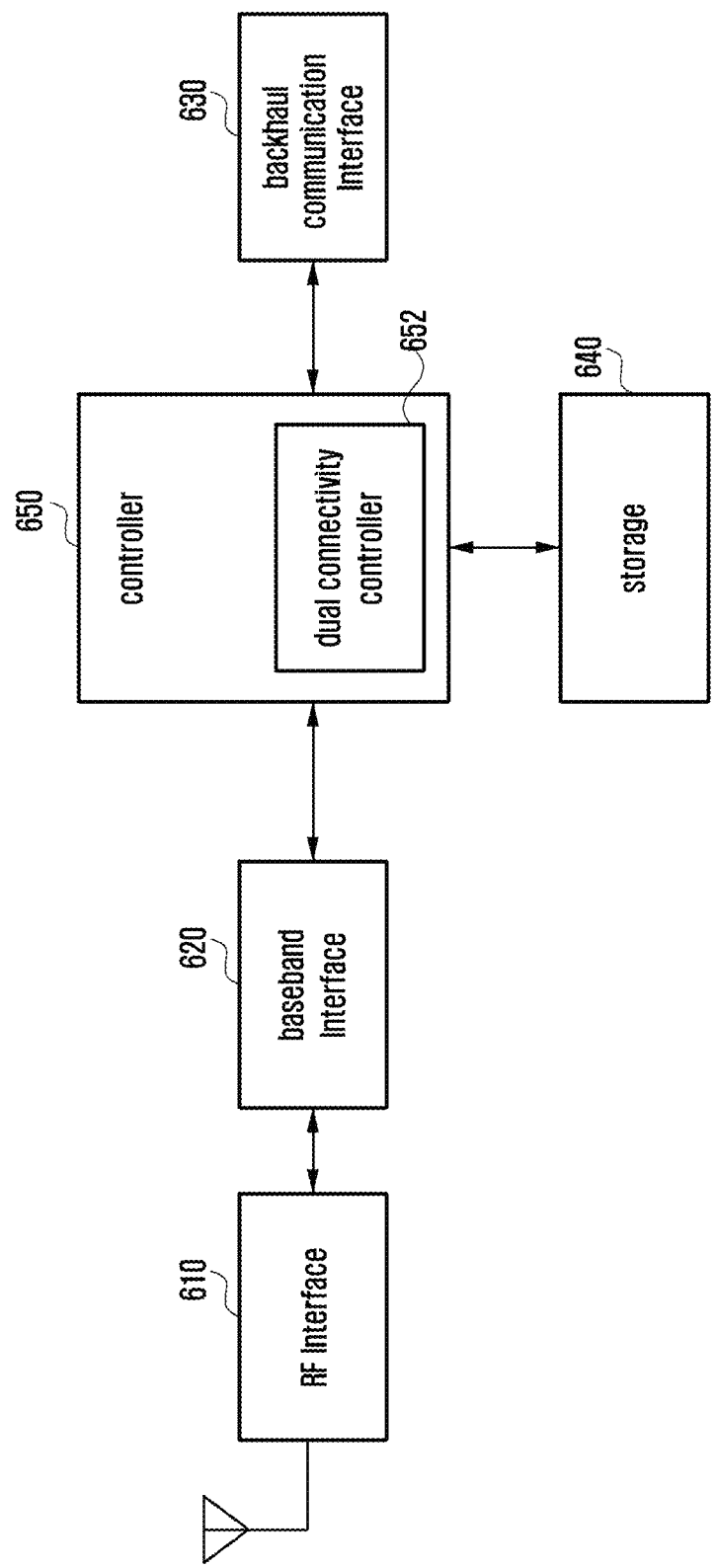
FIG. 6 illustrates a configuration of a primary eNB according to embodiments of the present invention.

FIG. 6 illustrates a configuration of a primary eNB according to embodiments of the present invention.

As shown in FIG. 6, the eNB includes an RF interface 610, a baseband interface 620, a backhaul communication interface 630, a storage 640, and a controller 650.

The RF interface 610 performs functions related to the transmission/reception of signals via a wireless channel, e.g., the conversion of frequency band, the amplification, etc. The RF interface 610 up-converts baseband signals output from the baseband interface 620 into RF band signals and transmits the RF signals via an antenna. The RF interface 610 down-converts RF band signals received via the antenna into baseband signals.

The RF interface 610 is capable of including a transmission filter, a reception filter, an amplifier, a mixer, an oscillator, a DAC, an ADC, etc. Although the embodiment is shown in FIG. 6 so that the embodiment includes only one antenna, it should be understood that the first access node may be implemented to include a number of antennas.

The RF interface 610 may also be implemented to include a number of RF chains. The RF processing unit 610 is capable of performing a beamforming operation. In order to perform a beamforming function, the RF interface 610 is capable of adjusting the phase and amplitude of individual signals transmitted/received via a number of antennas or antenna elements. The RF interface 610 is capable of transmitting one or more layers, thereby performing the downlink MIMO function.

The baseband interface 620 performs the conversion between baseband signals and bitstream according to a physical layer rule of a first wireless access technology. For example, in the data transmission, the baseband interface 620 encodes and modulates a transmission bitstream, thereby creating complex symbols.

In the data reception, the baseband interface 620 demodulates and decodes baseband signals output from the RF interface 610, thereby restoring a reception bitstream. For example, in the data transmission according to the orthogonal frequency division multiplexing (OFDM), the baseband interface 620 encodes and modulates a transmission bitstream to create complex symbols, maps the created complex symbols to sub-carriers, and configures OFDM symbols through the inverse fast Fourier transform (IFFT) operation and the cyclic prefix (CP) insertion.

In the data reception, the baseband interface 620 splits baseband signals output from the RF interface 610 into OFDM symbol units, restores signals mapped to sub-carriers through the fast Fourier transform (FFT) operation, and then restores a reception bitstream through the demodulation and decoding operation. The baseband interface 620 and the RF interface 610 perform the transmission and reception of signals as described above. Accordingly, the baseband interface 620 and the RF interface 610 may also be called a transmitter, a receiver, a transceiver, a communication interface, a wireless communication interface, etc.

The backhaul communication interface 630 provides interfaces to communicate with other nodes in the network. That is, the backhaul communication interface 630 converts: a bitstream into a physical signal to be transmitted to other nodes of the primary eNB, e.g., an auxiliary eNB, a core network, etc.; and a physical signal from the other nodes into a bitstream.

The storage 640 stores a default program for operating the primary eNB, applications, settings, data, etc. In particular, the storage 640 is capable of storing information regarding a bearer allocated to the connected UE, a measurement result reported from the connected UE, etc. The storage 640 is capable of providing the dual connectivity function to UE or storing information to determine whether to terminate the dual connectivity operation. The storage 640 provides the stored data according to the request of the controller 650.

The controller 650 controls all operations of the primary eNB. For example, the controller 650 controls the baseband interface 620, the RF interface 610 and the backhaul communication interface 630 to perform the transmission/reception of signals. The controller 650 controls the storage 640 to store/read data therein/therefrom. To this end, the controller 650 is capable of including at least one processor. The controller 650 is capable of including a dual connectivity controller 652 which provides UE with a dual connectivity function. For example, the controller 650 is capable of controlling the primary eNB to perform the functions and procedure described above referring to FIG. 3.

In some embodiments, the reliability of a Semi-Persistent Scheduling (SPS) activation signal and an SPS deactivation signal in the shared SPS operation are increased.

In such embodiments, a UE enables to receive a signal for activating or releasing a shared SPS to transmit, to the eNB, a regular BSR for the ACK/NACK signaling in response to the received signal.

With the evolution of mobile communication systems, the minimization of the uplink delay has become as an important issue. The present invention provides a shared SPS scheme for reducing the uplink relay.

Most of the uplink delay is caused in processes where the UE requests the allocation of a transmission resource and the transmission resource is allocated. In a state where the UE is successively allocated an SPS transmission resource, when data is created, the UE is capable of performing the rapid transmission of the data. However, when SPS transmission resources are dedicatedly allocated to all UE devices, the transmission resources are excessively consumed.

In order to resolve the problem, the present invention introduces a shared SPS scheme that allocates the same SPS transmission resource to a number of UE devices. UE devices configured with shared SPS perform the transmission of data only when the UE devices have the data to be transmitted. UE devices configured with shared SPS monitor PDCCH and apply different UE identifiers to the uplink scrambling, so that the eNB can identify uplink data from UE devices, respectively.

Since the shared SPS scheme uses only a small part of the given resources, it is preferable that the scheme is applied to a small cell abundant in transmission resources. Therefore, the shared SPS scheme is used for a serving cell specified by an eNB, unlike general SPS schemes.

The SPS is configured via RRC, and then activated or deactivated by using PDCCH. That is, when UE receives '0' for the NDI value, along with SPS C-RNTI provided via RRC, the UE considers SPS to be activated. On the other hand, when a pre-defined value, e.g., all values, are set to '0,' along with SPS C-RNTI, UE considers SPS to be deactivated.

Alternatively, the SPS may also be deactivated by an implicit release. The implicit release refers to a scheme that enables UE to release the configured uplink grant when the transmission of MAC PDU without MAC SDU (hereafter called 'Zero MAC SDU MAC PDU') is performed successively a number of times, n, via an SPS transmission resource. The implicit release is introduced to provide against the loss of SPS release signals.

However, when a shared SPS is applied, the implicit release needs to be ignored. This is because, when there is no data to be transmitted, MAC PDU without including MAC SDU needs not to be transmitted via a shared SPS resource, so that another UE can use the shared SPS resource.

In some embodiments, when UE receives an RRCConnectionReconfiguration message, using IE defined in the form of ENUMERATED {SETUP}, named SkipUplinkTX, and SkipUplinkTX, indicated by SETUP, is contained in sps-ConfigUL or MAC-MainConfig of the received RRC-ConnectionReconfiguration message, the UE ignores the implicit release.

When the shared SPS is activated or deactivated, the shared SPS scheme has a problem where the shared SPS scheme does not check whether UE correctly has received the activation (deactivation) signal.

An existing SPS technology uses HARQ ACK/NACK; however, the shared SPS scheme does not uses HARQ ACK/NACK since SPS C-RNTI for the monitoring is an identifier commonly applied to a number of UE devices. Therefore, an additional device that differs from existing devices is required to increase the reception reliability of an activation (deactivation) signal.

In some embodiments, when activating/deactivating a shared SPS, the transmission of regular buffer status report (BSR) to check whether UE has correctly received the activation (deactivation) signal is performed. The BSR is used to report an amount of data that UE needs to transmit to the eNB. When a BSR satisfies one of the following conditions, the BSR is reported to an eNB.

A buffer status report (BSR) shall be triggered if any of the following events occur:

UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus subheader, in which case the BSR is referred below to as "Padding BSR";

rebcBSR-Timer expires and the MAC entity has data available for transmission for any of the logical channels which belong to a LCG, in which case the BSR is referred below to as "Regular BSR";

periodicBSR-Timer expires, in which case the BSR is referred below to as "Periodic BSR".

Figure 7:
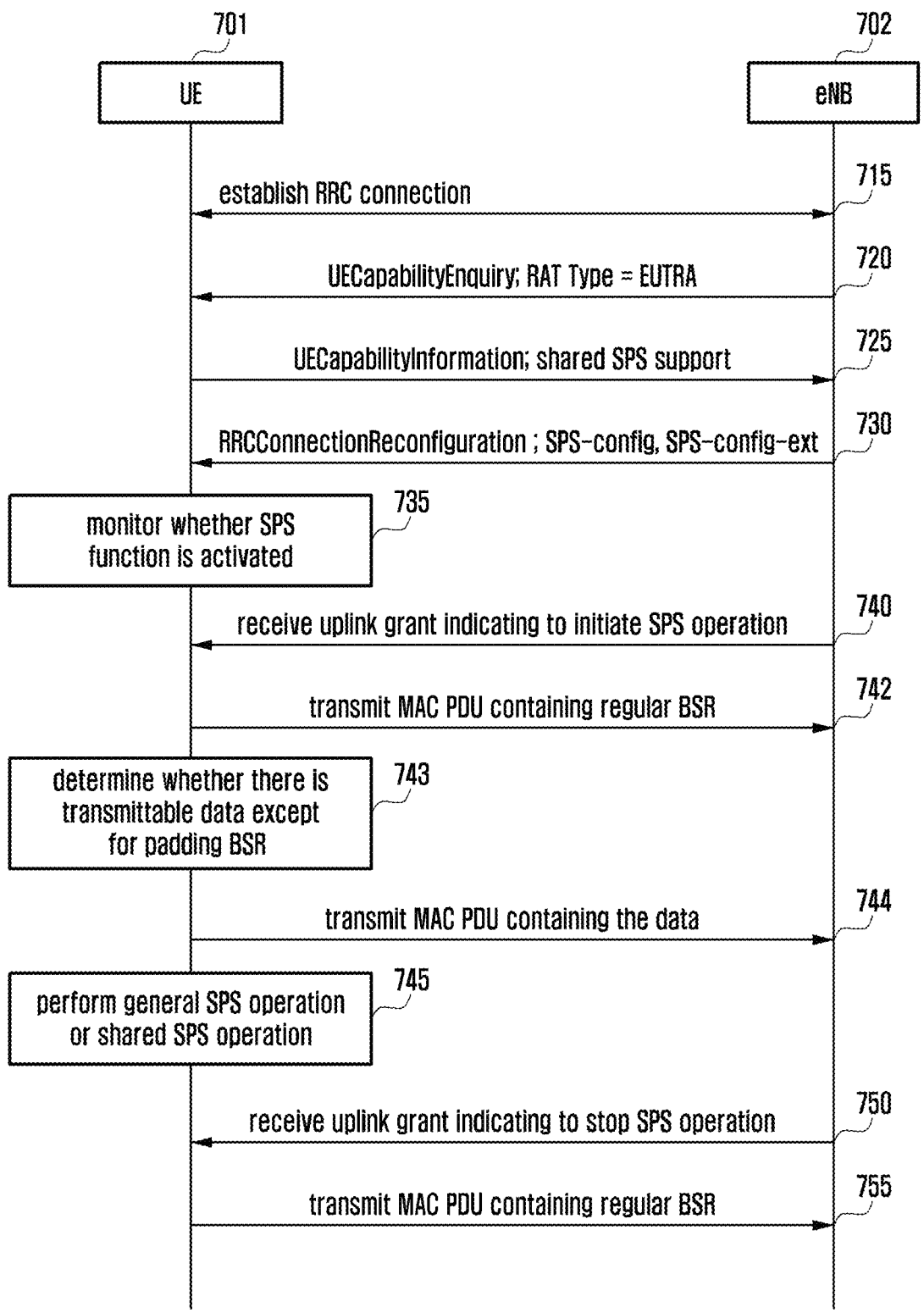
FIG. 7 illustrates a flow diagram of operations between UE and eNB according to embodiment of the present invention.

FIG. 7 illustrates a flow diagram of operations between UE and eNB according to embodiment of the present invention.

With reference to FIG. 7, a mobile communication system includes UE 705, an eNB 710 and nodes. The UE 705 establishes RRC connection with the eNB 710 in operation 715.

Establishing RRC connection between UE 705 and the eNB 710 means a state/condition where a Signaling Radio Bearer (SRB) is configured between the UE 705 and the eNB 710 so that the UE 705 and eNB 710 can transmit/receive RRC control messages to each other.

The RRC connection is established via a random access process in such a way that: UE 705 transmits an RRC connection establishment request message to the eNB 710;

the eNB 710 transmits an RRC connection establishment message to the UE 705; and the UE 705 transmits an RRC connection establishment complete message to the eNB 710.

After establishing the RRC connection, the eNB 710 is capable of transmitting, to the UE 705, a control message, UECapabilityEnquiry, instructing UE to report the UE capability, if the UE capability is necessary, in operation 720. The control message contains the field of a radio access technology (RAT) type, indicating a capability regarding an RAT, from among the capabilities of UE. When the eNB 710 receives a report of a capability regarding EUTRA, the eNB 710 sets the RAT Type to EUTRA.

When the UE 705 receives the UECapabilityEnquiry message where the RAT Type is set to EUTRA, the UE transmits, to the eNB 710, a control message, UECapabilityInformation, containing the UE's capability for EUTRA in operation 725.

The control message contains UE-EUTRA-Capability. The UE-EUTRA-Capability contains a name list of features supported by UE, categories of UE (ue-Category), a combination of frequency bands supported by UE (supportedBandCombination), etc. UE supports a shared SPS function and has completed the inter-Operability Test for the function. The control message may contain IE representing that UE supports a shared SPS function.

When the eNB 710 ascertains that the latency reduction needs to be applied to the UE 705, it is capable of instructing the UE 705 to perform the RRC connection reconfiguration in operation 730. The eNB 710 is capable of transmitting the shared SPS configuration information to the UE 705, via the RRC connection reconfiguration message. The shared SPS configuration information is formed with SPS-Config information and SPS-Config-ext.

Alternatively, in order to configure a shared SPS, Config-ext may be contained in the lower level information of sps-ConfigUL or MAC-MainConfig of an RRCConnectionReconfiguration message. The SkipUplinkTX may be contained in the lower level information of sps-ConfigUL or MAC-MainConfig or SPS-Config-ext.

The structure of the SPS-Config is as follows.

```
SPS-Config ::= SEQUENCE {
    semiPersistSchedC-RNTI          C-RNTI          OPTIONAL,       --
Need OR
    sps-ConfigDL            SPS-ConfigDL    OPTIONAL,       -- Need ON
    sps-ConfigUL            SPS-ConfigUL    OPTIONAL        -- Need ON
}
...
SPS-ConfigUL ::= CHOICE {
    release         NULL,
    setup           SEQUENCE {
        semiPersistSchedIntervalUL          ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        implicitReleaseAfter                ENUMERATED {e2, e3, e4, e8},
        p0-Persi stent                      SEQUENCE {
            p0-NominalPUSCH-Persistent              INTEGER (-126...24),
            p0-UE-PUSCH-Persistent                  INTEGER (-8..7)
        }       OPTIONAL,                                   -- Need OP
        twoIntervalsConfig                  ENUMERATED {true}       OPTIONAL,
-- Cond TDD
        ...,
        [[      p0-PersistentSubframeSet2-r12   CHOICE {
                release                         NULL,
                setup                           SEQUENCE {
                    p0-NominalPUSCH-PersistentSubframeSet2-r12          INTEGER
(-126..24),
                    p0-UE-PUSCH-PersistentSubframeSet2-r12              INTEGER (-8..7)
                }
        }                                       OPTIONAL        -- Need ON
        ]]
    }
}
N1PUCCH-AN-PersistentList ::=       SEQUENCE (SIZE (1..4)) OF INTEGER (0..2047)
-- ASN1STOP
```

| SPS-Config field descriptions |
|---|
| implicitReleaseAfter<br>Number of empty transmissions before implicit release, see TS 36.321 [6, 5.10.2], Value e2 corresponds to 2 transmissions, e3 corresponds to 3 transmissions and so on.<br>n1PUCCH-AN-PersistentList, n1PUCCH-AN-PersistentListP1<br>List of parameter: $n_{PUCCH}^{(1, p)}$ for antenna port P0 and for antenna port P1 respectively, see TS 36.213 [23, 10.1], Field n1-PUCCH-AN-PersistentListP1 is applicable only if the twoAntennaPortActivatedPUCCH-Format1a1b in PUCCH-ConfigDedicated-v1020 is set to true. Otherwise the field is not configured.<br>numberOfConfSPS-Processes<br>The number of configured HARQ processes for Semi-Persistent Scheduling, see TS 36.321 [6].<br>p0-NominalPUSCH-Persistent<br>Parameter: $P_{O\_NOMINAL\_PUSCH}^{(0)}$. See TS 36.213 [23, 5.1.1.1], unit dBm step 1. This field is applicable for persistent scheduling, only. If choice setup is used and p0-Persistent is absent, apply the value of p0-NominalPUSCH for p0-NominalPUSCH-Persistent. If uplink power control subframe sets are configured by tpc-SubframeSet, this field applies for uplink power control subframe set 1.<br>p0-NominalPUSCH-PersistentSubframeSet2<br>Parameter: $P_{O\_NOMINAL\_PUSCH}^{(0)}$. See TS 36.213 [23, 5.1.1.1], unit dBm step 1. This field is applicable for persistent scheduling, only. If p0-PersistentSubframeSet2-r12 is not configured, apply the value of p0-NominalPUSCH-SubframeSet2-r12 for p0-NominalPUSCH-PersistentSubframeSet2. E-UTRAN configures this field only if uplink power control subframe sets are configured by tpc-SubframeSet, in which case this field applies for uplink power control subframe set 2.<br>p0-UE-PUSCH-Persistent<br>Parameter: $P_{O\_UE\_PUSCH}^{(0)}$. See TS 36.213 [23, 5.1.1.1], unit dB. This field is applicable for persistent scheduling, only. If choice setup is used and p0-Persistent is absent, apply the value of p0-UE-PUSCH for p0-UE-PUSCH-Persistent. If uplink power control subframe sets are configured by tpc-SubframeSet, this field applies for uplink power control subframe set 1.<br>p0-UE-PUSCH-PersistentSubframeSet2<br>Parameter: $P_{O\_UE\_PUSCH}^{(0)}$. See TS 36.213 [23, 5.1.1.1], unit dB. This field is applicable for persistent scheduling, only. If p0-PersistentSubframeSet2-r12 is not configured, apply the value of p0-UE-PUSCH-SubframeSet2 for p0-UE-PUSCH-PersistentSubframeSet2. E-UTRAN configures this field only if uplink power control subframe sets are configured by tpc-SubframeSet, in which case this field applies for uplink power control subframe set 2.<br>semiPersistSchedC-RNTI<br>Semi-persistent Scheduling C-RNTI, see TS 36.321 [6].<br>semiPersistSchedIntervalDL<br>Semi-persistent scheduling interval in downlink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames.<br>semiPersistSchedIntervalUL<br>Semi-persistent scheduling interval in uplink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames.<br>twoIntervalsConfig<br>Trigger of two-intervals-Semi-Persistent Scheduling in uplink. See TS 36.321 [6, 5.10], If this field is present, two-intervals-SPS is enabled for uplink. Otherwise, two-intervals-SPS is disabled. |

| Conditional presence | Explanation |
|---|---|
| TDD | This field is optional present for TDD, need OR; it is not present for FDD and the UE shall delete any existing value for this field. |

The structure of the SPS-Config-ext is as follows.

```
SPS-Config-ext ::= SEQUENCE {
    semiPersistSchedC-RNTI2         C-RNTI
        OPTIONAL,
    semiPersistSchedIntervalUL2     ENUMERATED {
        sf1, sf2, sf4, sf6, sf8, spare3, spare2,
        spare1},
```

-continued

```
    logicalChannelIdList            ...
    SharedSPSenabledCell            ServCellIndex
}
...
```

In summary, SPS-config is formed with the following IEs:
First SPS C-RNTI (semiPersistSchedC-RNTI) First interval (semiPersistSchedIntervalUL) Automatic release parameter (semiPersistSchedC-RNTI)

SPS-Config-ext is formed with the following IEs:
Shared SPS indicator (SPS-Config-ext may serve as a shared SPS indicator or an additional indicator may be used)
Second SPS C-RNTI (semiPersistSchedC-RNTI2)
Second interval (semiPersistSchedIntervalUL2)
Logical channel list (logicalChannelIdList): a name list of logical channels capable of using a shared SPS serving cell id (SharedSPSenabledCell): an identifier of a serving cell where a shared SPS is activated/employed SkipUplinkTX: Implicit release is ignored when indicated by SETUP. (A corresponding IE may serve as a shared SPS indicator)

The UE 705 monitors whether the SPS function is activated in operation 735. The UE 705 monitors whether a general SPS and a shared SPS are activated, respectively.

Setting a general SPS function to a UE device means that: only SPS-config is set to UE at a corresponding timing but SPS-config-ext is not set thereto. In this case, the UE has received an rrcConnectionReconfiguration message containing valid SPS-config from the eNB. The UE has not released the received SPS-config. The UE has not received the SPS-Config-ext. Although the UE received the SPS-Config-ext, the UE has already released the SPS-Config-ext. For example, when UE, not set with an SPS, receives an rrcConnectionReconfiguration control message that contains only SPS-config but does not contain SPS-Config-ext, rrcConnectionReconfiguration control message is set with a general SPS.

Setting a shared SPS function to a UE device means that: SPS-config and SPS-config-ext are set to UE at a corresponding timing. In this case, the UE has received an rrcConnectionReconfiguration message containing valid SPS-config and valid SPS-Config-ext from the eNB. The UE has not released the received SPS-config and the received SPS-Config-ext.

For example, when a UE, not set with an SPS, receives an rrcConnectionReconfiguration control message wherein SPS-config and SPS-Config-ext are contained, it means that the UE has been set with a shared SPS.

A UE sets with a general SPS monitors PDCCH of PCell or PSCell (hereafter called SpCell) and determines whether SPS is activated. When the UE receives uplink grant through a first SPS C-RNTI via the PDCCH of SpCell, the UE monitors a new data indicator (NDI) of the uplink grant. When the NDI is '0' and information regarding the PDCCH is not information specifying the release, the UE stores the uplink grant and the associated HARQ information as configured uplink grant and initiates the SPS operation.

else, if this Serving Cell is the SpCell and if an uplink grant for this TTI has been received for the SpCell on the PDCCH of the SpCell for the MAC entity's Semi-Persistent Scheduling C-RNTI:
    if the NDI in the received HARQ information is 1:
    consider the NDI for the corresponding HARQ process not to have been toggled;
    deliver the uplink grant and the associated HARQ information to the HARQ entity for this TTI.
    else if the NDI in the received HARQ information is 0:
    if PDCCH contents indicate SPS release:
    clear the configured uplink grant (if any).
    else:
    store the uplink grant and the associated HARQ information as configured uplink grant;
    initialize (if not active) or re-initialize (if already active) the configured uplink grant to start in this TTI and to recur according to rules in subclause 5.10.2 (according to semiPersistSchedIntervalUL);
    consider the NDI bit for the corresponding HARQ process to have been toggled;
    deliver the configured uplink grant and the associated HARQ information to the HARQ entity for this TTI.
    HARQ information: HARQ information for DL-SCH or for UL-SCH transmissions consists of New Data Indicator (NDI), Transport Block (TB) size. For DL-SCH transmissions the HARQ information also includes HARQ process ID. For UL-SCH transmission the HARQ information also includes Redundancy Version (RV). In case of spatial multiplexing on DL-SCH the HARQ information comprises a set of NDI and TB size for each transport block. HARQ information for SL-SCH and SL-DCH transmissions consists of TB size only.

Via a PDCCH of a serving cell specified as SharedSPSenabledCell; or via a PDCCH of a scheduling cell of the serving cell (refer to the cell CrossCarrierSchedulingConfig which provides scheduling information regarding the serving cell) in a state where the cross-carrier scheduling is employed, when UE set with a shared SPS receives uplink grant through an SPS C-RNTI, the UE monitors an NDI of the uplink grant. When the NDI is '0' and information regarding the PDCCH is not information specifying the release, UE stores the uplink grant and the associated HARQ information as configured uplink grant and initiates the shared SPS operation.

The SPS C-RNTI for the monitoring may be first SPS C-RNTI or second SPS C-RNTI. The following operations are explained, assuming the second SPS C-RNTI.

else, if this Serving Cell is the SharedSPSenabledCell and if an uplink grant for this TTI has been received for the SharedSPSenabledCell on the PDCCH of the Shared-SPSenabledCell for the MAC entity's Semi-Persistent Scheduling C-RNTI2:
    if the NDI in the received HARQ information is 1:
    consider the NDI for the corresponding HARQ process not to have been toggled;
    deliver the uplink grant and the associated HARQ information to the HARQ entity for this TTI.
    else if the NDI in the received HARQ information is 0:
    if PDCCH contents indicate SPS release:
    clear the configured shared uplink grant (if any).
    else:
    store the uplink grant and the associated HARQ information as configured shared uplink grant;
    initialize (if not active) or re-initialize (if already active) the configured shared uplink grant to start in this TTI and to recur according to semiPersistSchedIntervalUL2;
    consider the NDI bit for the corresponding HARQ process to have been toggled;
    deliver the configured shared uplink grant and the associated HARQ information to the HARQ entity for this TTI.

In a general SPS operation, the SPS C-RNTI for monitoring an SPS activation signal is identical to the SPS C-RNTI for scrambling PUSCH. That is, UE monitors the PDCCH by using one SPS C-RNTI as a first SPS C-RNTI, and scrambles the uplink data.

In a shared SPS operation, an SPS C-RNTI for monitoring PDCCH and an SPS C-RNTI for scrambling the uplink data are separated from each other. For example, PDCCH is monitored by a first SPS-CRNTI and PUSCH is scrambled by a second SPS C-RNTI. Alternatively, PDCCH is monitored by a second SPS-CRNTI and PUSCH is scrambled by a first SPS C-RNTI. These operations are separately performed because an SPS C-RNTI for the monitoring is an identifier which is commonly applied to a number of UE devices, and thus an eNB cannot identify, when uplink data is scrambled with the SPS C-RNTI for the monitoring, UE transmitting the uplink data.

Therefore, an SPS C-RNTI for the uplink scrambling employs a UE specific SPS C-RNTI. That is, an eNB allocates the same value to an SPS C-RNT for the monitoring for a number of UE devices in a shared SPS. On the other hand, the eNB allocates unique values to SPS C-RNTIs for the scrambling for UE devices, respectively.

Scrambling PUSCH by using an SPS C-RNTI is defined in the TS 36.212 and TS 36.213.

When the UE 705 receives an uplink grant instructing the UE to initiate a general SPS operation or a shared SPS operation in operation 740, the UE initiates a general SPS operation or a shared SPS operation in operation 745.

More specifically, when the NDI is '0,' and PDCCH addressed by an SPS C-RNTI does not indicates an SPS release in operation 740, the UE 705 activates an SPS for the indicated transmission resource on the PDCCH and transmits a regular BSR to the eNB.

When the eNB 710 has not received the BSR for a pre-set period of time since the transmission of an SPS signal for the pre-scheduling, the eNB ascertains that the signal is lost.

When a shared SPS is activated or deactivated to transmit a regular BSR, the present invention checks whether UE correctly receives an activation (deactivation) signal. Therefore, a condition for triggering an existing regular BSR is added as follows.

SkipUplinkTx is configured and PDCCH addressed by SPS C-RNTI with NDI set to 0 is received, in which case the BSR is referred below to as "Regular BSR".

The present invention includes a new BSR trigger condition. That is, when a specified UE device is set with a shared SPS and receives PDCCH addressed by an SPS C-RNTI where the NDI is '0,' the UE transmits a regular BSR to the eNB 710. In an embodiment of the present invention, the following methods may be considered so that the eNB 710 can identify the regular BSR transmitted as an ACK in response to the shared SPS.

1) A value of a buffer storing a BSR is set to a pre-defined value;
2) The BSR is transmitted as a truncated BSR; or
3) The BSR is transmitted in a newly defined BSR format.

Based on the methods, the BSR may have Buffer Status (BS) index values as in the following table. Each index value represents a range of buffer size that UE needs to use in the transmission. A specified one of the values may be used for only the ACK of a shared SPS as shown in TABLE 3.

TABLE 3

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |

TABLE 3-continued

| Index | Buffer Size (BS) value [bytes] |
|---|---|
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

Figure 8:
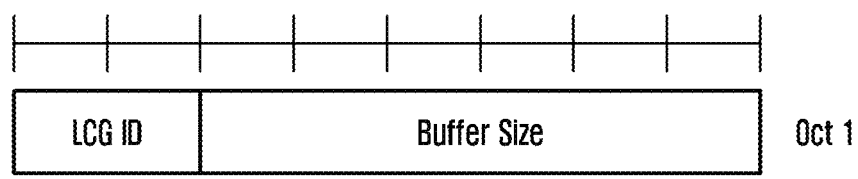
FIG. 8 illustrates a format of a buffer status report (BSR) according to embodiment of the present invention.

FIG. 8 illustrates a format of a BSR according to embodiment of the present invention.

The truncated BSR may have a format as follows. The format of the truncated BSR is 1 byte in size where the first two bits indicate an LCG ID value and the remaining six bits indicates a BS index value as described above in the table. When the remaining size of the MAC PDU is less than 4 bytes and thus a general padding BSR does not receive a Long BSR of 4 bits, the truncated BSR is used to transmit an LCG BS index value with the highest priority. The truncated BSR is identical in format to the short BSR. In an embodiment of the present invention, although the remaining size of the MAC PDU has space, when an eNB receives a BSR of 1 bit, the eNB considers the BSR to be the ACK of a shared SPS.

It should be understood that the present invention is not limited to the BSR format shown in FIG. 8 but may define various formats of BSR according to design specifications. In some embodiments of general SPS operation, a UE performs the uplink transmission, using an SPS resource, at a cycle of semiPersistSchedIntervalUL (a cycle included in the SPS-config) in SpCell, based on a sub-frame initiating an SPS operation. For example, UE ascertains that the $N^{th}$ grant has been created in a lower sub-frame of an SpCell, and performs the uplink transmission by applying a corresponding grant to the sub-frame.

consider sequentially that the $N^{th}$ grant occurs in the subframe for which:

(10*$SFN$+subframe)=[(10*$SFN_{start\ time}$+subframe$_{start\ time}$)+
$N$*semiPersistSchedIntervalUL+Subframe_Offset*($N$ modulo 2)]modulo 10240.

Where $SFN_{start\ time}$ and $subframe_{start\ time}$ are the SFN and subframe, respectively, at the time the configured uplink grant were (re-)initialised.

Although the UE does not have data to be transmitted at a corresponding timing when transmitting an MAC PDU via the SPS resource, the UE creates and transmits a padding MAC PDU including BSR MAC CE and Padding MAC CE. The UE performs the scrambling for the uplink transmission by employing a first SPS C-RNTI.

When only MAC PDU without MAC SDU is transmitted for a number of times, implicitReleaseAfter, the UE releases the configured uplink grant.

In some embodiments of shared SPS operation, a UE performs the uplink transmission, using a shared SPS resource, at a cycle of semiPersistSchedIntervalUL2 (a cycle included in the SPS-config-ext) in the SharedSPSenabled-Cell, based on a sub-frame initiating an SPS operation. For example, the UE ascertains that the $N^{th}$ grant has been created in a lower sub-frame of an SpCell, and performs the uplink transmission by applying a corresponding grant to the sub-frame.

consider sequentially that the $N^{th}$ grant occurs in the subframe for which:

$(10*SFN+subframe)=[(10*SFN_{start\ time}+subframe_{start\ time})+N*semiPersistSchedIntervalUL2]modulo\ 10240.$ Where $SFN_{start\ time}$ and $subframe_{start\ time}$ are the SFN and subframe, respectively, at the time the configured shared uplink grant were (re-)initialised.

Referring back to FIG. 7, when the UE 705 does not have 'data that can be transmitted via a shared SPS transmission resource' at a corresponding timing in transmitting MAC PDU via the SPS resource, the UE 705 does not perform the uplink transmission. When the UE 705 has transmittable data in operation 743, the UE 705 performs the uplink transmission in operation 744.

Although only MAC PDU without MAC SDU has been transmitted for a number of times, implicitReleaseAfter, UE 705 does not release the configured uplink grant. The MAC PDU without MAC SDU refers to MAC PDU that contains only MAC CE but does not contain MAC SDU containing high layer data.

The UE 705 performs the scrambling for the uplink transmission by employing an SPS C-RNTI that differs from an SPS C-RNTI used to monitor PDCCH. The SPS C-RNTI applied to the scrambling may be a C-RNTI of the UE 705. That is, the identifier may be formed in various combinations as in the following table 4.

TABLE 4

| Identifier for monitoring PDCCH | Identifier for scrambling uplink |
| --- | --- |
| semiPersistSchedC-RNTI of SPS-config | semiPersistSchedC-RNTI2 of SPS-config-ext |
| semiPersistSchedC-RNTI2 of SPS-config-ext | semiPersistSchedC-RNTI of SPS-config |
| semiPersistSchedC-RNTI of SPS-config | C-RNTI allocated in the RRC connection configuration or C-RNTI of mobilityControlInfo |

The last case is a state where SPS C-RNTI 2 is not allocated in SPS-config-ext. In this case, UE performs the scrambling for the shared SPS uplink transmission, using the UE's C-RNTI as a UE specific identifier.

As described above, a UE is capable of transmitting only data of a logical channel, logicalChannelIdList, via a shared SPS transmission resource. Although UE has data of other logical channels (e.g., RRC messages, etc.), except for the data of the logicalChannelIdList, the UE does not consider the data to be 'data that can be transmitted via a shared SPS transmission resource' but considers only data of a logical channel of the logicalChannelIdList to be 'data that can be transmitted via a shared SPS transmission resource.'

When the UE 705 receives the uplink grant indicating the SPS release in operation 750, the UE 705 terminates the SPS operation and releases the configured uplink grant or the configured shared uplink grant.

More specifically, when the NDI is '0' and PDCCH addressed by an SPS C-RNTI indicates the SPS release, the UE 705 deactivates the SPS for the indicated transmission resource on the PDCCH and transmits a regular BSR to the eNB 710 in operation 755.

Figure 9:
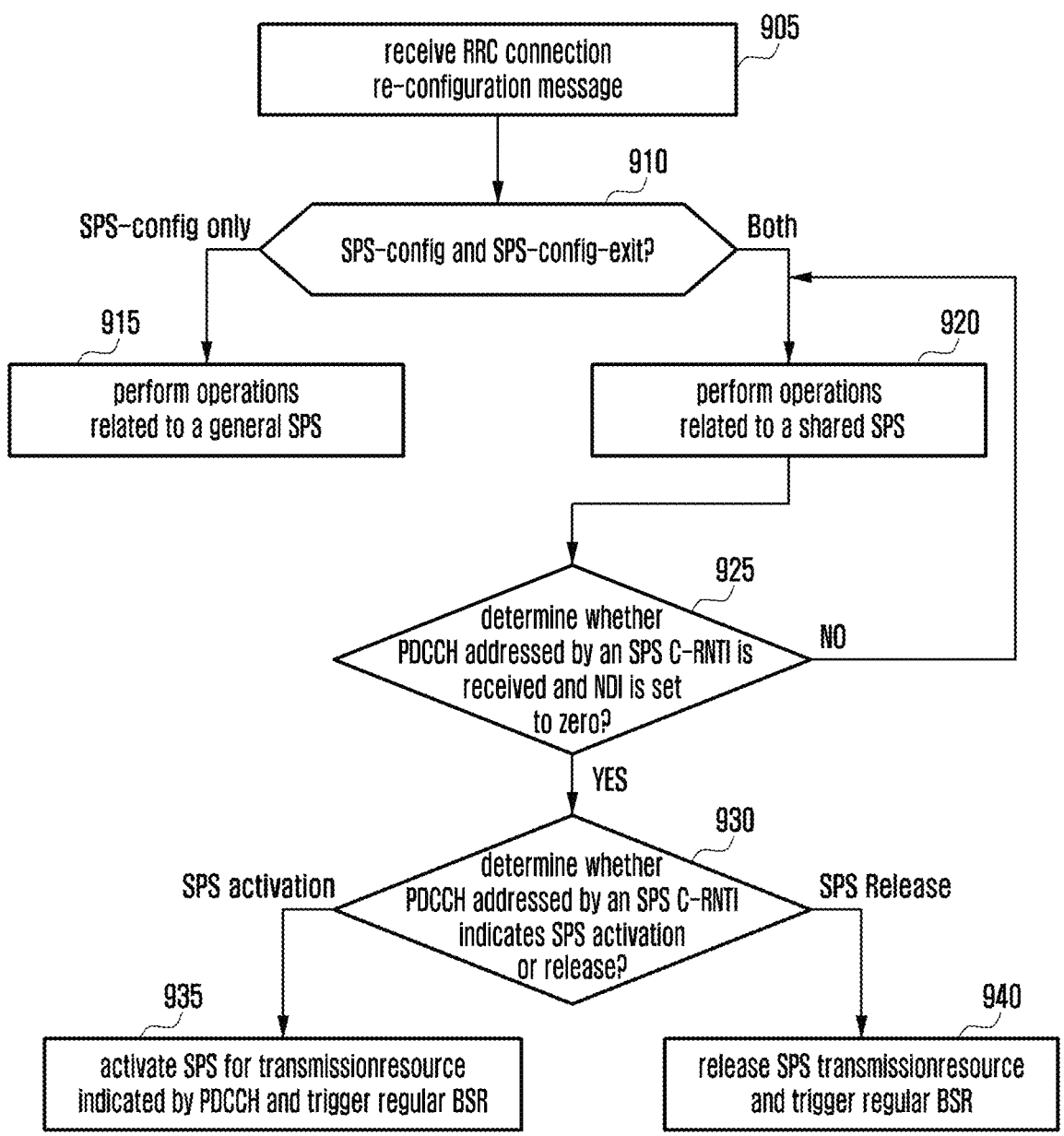
FIG. 9 illustrates a flowchart of operations of UE according to embodiment of the present invention.

FIG. 9 illustrates a flowchart of operations of UE according to embodiment of the present invention.

When the UE has not received valid SPS-config, or, although the UE received valid SPS-config, the UE has already released the SPS-config, the UE receives a control message, RRCConnectionReconfiguration, in operation 905. The UE determines whether the control message contains SPS-config and SPS-config-ext in operation 910.

When the UE ascertains that the control message contains only SPS-config in operation 910, the UE performs operations related to a general SPS in operation 915. When the UE ascertains that the control message contains both SPS-config and SPS-config-ext in operation 910, the UE performs operations related to a shared SPS in operation 920 as shown in TABLE 5.

TABLE 5

| Operations related to general SPS | Operations related to shared SPS |
| --- | --- |
| Monitor PDCCH of SpCell | Monitor PDCCH of SharedSPSenabledCell |
| Determine whether to receive an uplink grant instructing to initiate a general SPS operation by using semiPersistSchedC-RNTI allocated in SPS-config | Determine whether to receive an uplink grant instructing to initiate operations related to a shared SPS operation by using an identifier for monitoring PDCCH |
| Apply an SPS cycle to semiPersistSchedIntervalUL of SPS-config | Apply an SPS cycle to semiPersistSchedIntervalUL2 of SPS-config-ext |
| Scramble the transmission of PUSCH via an SPS resource, by using 'semiPersistSchedC-RNTI allocated in SPS-config' | Scramble the transmission of PUSCH via an SPS resource, by using an 'identifier for uplink scrambling' |
| Transmit uplink data via PUSCH of SpCell | Transmit uplink data via PUSCH of SharedSPSenabledCell |
| Transmit padding MAC PDU when there is no data available for transmission | Omit the transmission when there is no data available for transmission |
| Release an SPS transmission resource when | Maintain an SPS transmission resource |

TABLE 5-continued

| Operations related to general SPS | Operations related to shared SPS |
| --- | --- |
| 'MAC PDU without SDU' is successively transmitted a preset number of times | although 'MAC PDU without SDU' is successively transmitted a preset number of times |

Alternatively, the UE may perform another operations as shown in TABLE 6.

TABLE 6

| Operations related to general SPS | Operations related to shared SPS |
| --- | --- |
| Monitor PDCCH of SpCell | Monitor PDCCH of SpCell |
| Monitor Dedicate Search Space of SpCell PDCCH | Monitor Common Search Space of SpCell PDCCH |
| Determine whether to receive uplink grant instructing to initiate a general SPS operation by using semiPersistSchedC-RNTI allocated in SPS-config | Determine whether to receive uplink grant instructing to initiate operations related to a shared SPS operation by using an identifier for monitoring PDCCH |
| The same as described above | The same as described above |
| The same as described above | The same as described above |
| The same as described above | The same as described above |
| The same as described above | The same as described above |

The UE receives PDCCH instructed by an SPS C-RNTI, and determines whether the NDI is set to '0' in operation 925. The UE determines whether the PDCCH instructs the SPS activation or deactivation (release) in operation 930.

When the UE ascertains that the PDCCH instructs the SPS activation in operation 930, the UE activates the SPS for the transmission resource instructed by the PDCCH and transmits a regular BSR to the eNB in operation 935. On the other hand, when the UE ascertains that the PDCCH instructs the SPS deactivation in operation 930, the UE releases the SPS and transmits a regular BSR to the eNB in operation 940.

Figure 10:
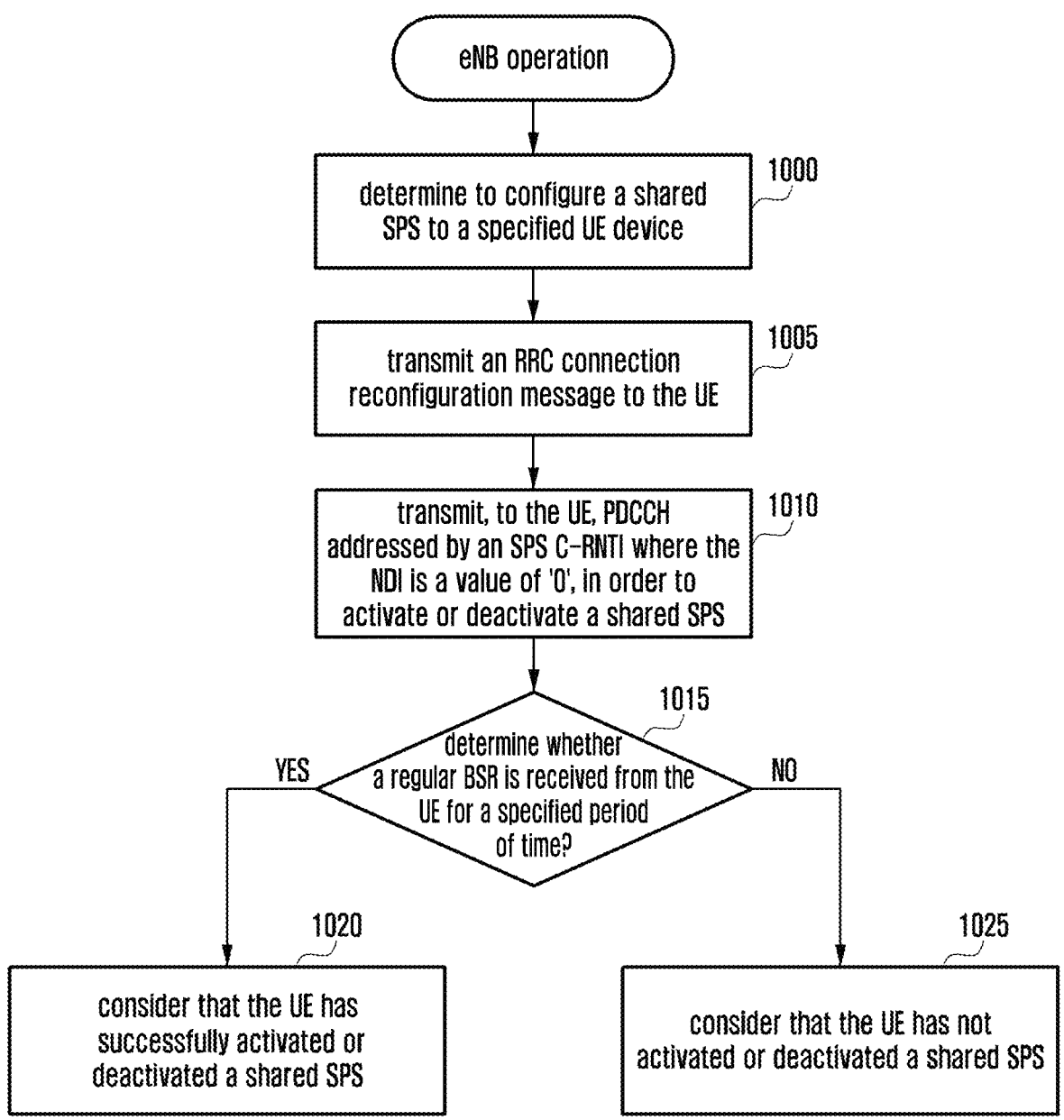
FIG. 10 illustrates a flowchart of operations of an eNB according to embodiment of the present invention.

FIG. 10 illustrates a flowchart of operations of an eNB according to embodiment of the present invention.

The eNB determines to configure a shared SPS to a specified UE device in operation 1000. The eNB transmits an RRC connection reconfiguration message to the UE in order to configure a shared SPS to the UE in operation 1005. The RRC message contains information required to configure a shared SPS.

The eNB activates or deactivates the shared SPS by using PDCCH in operation 1010. To this end, the PDCCH is addressed by an SPS C-RNTI where the NDI is a value of '0.' After transmitting the PDCCH to the UE, the eNB determines whether the eNB receives a regular BSR from the UE for a specified period of time in operation 1015.

When the eNB receives a regular BSR from the UE before a specified period of time elapses in operation 1015, the eNB considers that the UE has successfully received the activation (deactivation) signal in operation 1020. In order to indicate that the regular BSR has the purpose of acknowledging failure or success of the reception of activation (deactivation) signal, the regular BSR may have a specified buffer status (BR) index value or a truncated BSR or a new BSR format may be used. When the eNB has not received a regular BSR from the UE in operation 1015, the eNB considers that the UE has not activated or deactivated a shared SPS in operation 1025.

In some embodiments, an eNB enables to use a regular BSR on the uplink in order to determine whether UE has correctly received an activation (deactivation) signal of a shared SPS.

In some embodiments, a new MAC CE to comply with the purpose described above is defined. For example, a newly defined MAC CE may be assigned a new uplink LCD that differs from that allocated to an existing MAC CE. The newly defined MAC CE has a sub-header containing the LCD, but does not have an MAC CE in the MAC payload of the MAC PDU (zero bits).

The eNB transmits PDCCH to activate or deactivate a shared SPS, and then determines whether the LCID is contained in the sub-header of the specified MAC PDU for a specified period of time, x. When the eNB ascertains that the LCID is contained in the sub-header of the specified MAC PDU, the eNB considers that the UE has successfully received the PDCCH.

As described above, Aforementioned embodiments are capable of increasing the reliability of an activation/release signal of the SPS for prescheduling during the latency reduction SI In some embodiments, a regular BSR is triggered when an activation/release signal of the SPS for prescheduling is received.

A buffer status report (BSR) may be triggered if any of the following events occur:

UL data, for a logical channel which belongs to an LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to an LCG, in which case the BSR is referred below to as "Regular BSR";

UL resources are allocated and number of padding bits is equal to or larger than the size of the buffer status report MAC control element and a subheader, in which case the BSR is referred below to as "Padding BSR";

retxBSR-Timer expires and the MAC entity has data available for transmission for any of the logical channels which belong to a LCG, in which case the BSR is referred below to as "Regular BSR";

periodicBSR-Timer expires, in which case the BSR is referred below to as "Periodic BSR".

SkipUplinkTx is configured and PDCCH addressed by SPS C-RNTI with NDI set to 0 is received, in which case the BSR is referred below to as "Regular BSR".

When an eNB has not received a BSR for a preset period of time since the transmission of a signal for the SPS for pre-scheduling, the eNB ascertains that the signal is lost.

The aforementioned embodiments of the present invention operate as follows.

Configure RRC connection with eNB;
Receive an RRC connection reconfiguration message from an eENB;
SPS configuration information;
Pre-scheduling indicator;
Monitor SPS C-RNTI in a serving cell;
Receive NDI=0 and PDCCH addressed by SPS C-RNTI; and the SPS release is not indicated;
Activate an SPS for an indicated transmission resource on the PDCCH and trigger a regular BSR;
Transmit data using the SPS resource;
Transmit transmittable data except for a padding BSR; otherwise, omit the transmission;
Receive NDI=0 and PDCCH addressed by an SPS C-RNTI; and the SPS release is not indicated;
Replace an existing SPS transmission resource with the newly indicated transmission resource and trigger a regular BSR;
Transmit data using the SPS resource;
Receive NDI=0 and PDCCH addressed by an SPS C-RNTI; and the SPS release is indicated; and
Releases the SPS transmission resource and trigger a regular BSR.

In some embodiments, a BRS is a regular BSR for the SPS ACK; e.g., BS is set to a specified value; a truncated BSR is transmitted; a new BSR format is defined, etc.

In aforementioned embodiments, the cell selection and re-selection using a number of PMAX parameters are effectively performed.

In aforementioned embodiments, the reliability of a semi-persistent scheduling (SPS) activation signal and an SPS deactivation signal in the shared SPS operation are increased.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
receiving, from a base station, a system information block (SIB) including first maximum power information and at least one second maximum power information;
obtaining a first maximum transmission power level for a cell based on the first maximum power information and a second maximum transmission power level for the cell based on one from the at least one second maximum power information;
identifying a compensation parameter ($P_{compensation}$) associated with a cell selection reception level value (Srxlev) based on the first maximum transmission power level and the second maximum transmission power level;
identifying the Srxlev for the cell based on the $P_{compensation}$; and
performing a cell selection for the cell, based on the identified Srxlev, wherein the by: $P_{compensation}$ is identified by:

$$P_{compensation} = \max(P_{EMAX1} - P_{PowerClass}, 0) - (\min(P_{EMAX2}, P_{PowerClass}) - \min(P_{EMAX1}, P_{PowerClass})),$$

where the $P_{EMAX1}$ is the first maximum transmission power level, $P_{EMAX2}$ is the second maximum transmission power level, and the $P_{Powerclass}$ is a maximum radio frequency output power of the terminal.

2. The method of claim 1, wherein the Srxlev is identified by subtracting a minimum required reception level in the cell ($Q_{rxlevmin}$), an offset to the $Q_{rxlevmin}$ ($Q_{rxlevminoffset}$), and the $P_{compensation}$ from a measured cell reception level value ($Q_{rxlevmeas}$).

3. The method of claim 2, wherein the cell selection is performed as a result of a periodic search for a higher priority public land mobile network (PLMN) while camped on a visited PLM N (VPLMN).

4. The method of claim 3, wherein the cell selection for the cell is performed, in case that the identified Srxlev for the cell is larger than 0 and a cell selection quality value (Squal) for the cell is larger than 0.

5. A method performed by a base station in a wireless communication system, the method comprising:
generating first maximum power information and at least one second maximum power information; and
transmitting, to a terminal, a system information block (SIB) including the first maximum power information and the at least one second maximum power information,
wherein a first maximum transmission power level for a cell is obtained based on the first maximum power information, and a second maximum transmission power level for the cell is obtained based on one from the at least one second maximum power information,
wherein a compensation parameter ($P_{compensation}$) associated with a cell selection reception level value (Srxlev) is identified based on the first maximum transmission power level and the second maximum transmission power level,
wherein the Srxlev for the cell is identified based on the $P_{compensation}$,
wherein a cell selection for the cell is performed based on the identified Srxlev, and
wherein the by: $P_{compensation}$ is identified by:

$$P_{compensation} = \max(P_{EMAX1} - P_{PowerClass}, 0) - (\min(P_{EMAX2}, P_{PowerClass}) - \min(P_{EMAX1}, P_{PowerClass})),$$

where the $P_{EMAX1}$ is the first maximum transmission power level, $P_{EMAX2}$ is the second maximum transmission power level, and the $P_{Powerclass}$ is a maximum radio frequency output power of the terminal.

6. The method of claim 5, wherein the Srxlev is identified by subtracting a minimum required reception level in the cell ($Q_{rxlevmin}$), an offset to the $Q_{rxlevmin}$ ($Q_{rxlevminoffset}$), and the $P_{compensation}$ from a measured cell reception level value ($Q_{rxlevmeas}$).

7. The method of claim 6, wherein the cell selection is performed as a result of a periodic search for a higher priority public land mobile network (PLMN) while camped on a visited PLM N (VPLMN).

8. The method of claim 7, wherein the cell selection for the cell is performed, in case that the identified Srxlev for the cell is larger than 0 and a cell selection quality value (Squal) for the cell is larger than 0.

9. A terminal in a wireless communication system, the terminal comprising:
a transceiver configured to transmit and receive a signal; and a controller configured to:
receive, from a base station, a system information block (SIB) including first maximum power information and at least one second maximum power information,
obtain a first maximum transmission power level for a cell based on the first maximum power information and a second maximum transmission power level for the cell based on one from the at least one second maximum power information,
identify a compensation parameter ($P_{compensation}$) associated with a cell selection reception level value (Srxlev) based on the first maximum transmission power level and the second maxim um transmission power level,
identify the Srxlev for the cell based on the $P_{compensation}$, and
perform a cell selection for the cell, based on the identified Srxlev,
wherein the by: $P_{compensation}$ is identified by:

$$P_{compensation} = \max(P_{EMAX1} - P_{PowerClass}, 0) - (\min(P_{EMAX2}, P_{PowerClass}) - \min(P_{EMAX1}, P_{PowerClass})),$$

where the $P_{EMAX1}$ is the first maximum transmission power level, $P_{EMAX2}$ is the second maximum transmission power level, and the $P_{Powerclass}$ is a maximum radio frequency output power of the terminal.

10. The terminal of claim 9, wherein the Srxlev is identified by subtracting a minimum required reception level in the cell ($Q_{rxlevmin}$), an offset to the $Q_{rxlevmin}$ ($Q_{rxlevminoffset}$), and the $P_{compensation}$ from a measured cell reception level value ($Q_{rxlevmeas}$).

11. The terminal of claim 10, wherein the cell selection is performed as a result of a periodic search for a higher priority public land mobile network (PLMN) while camped on a visited P LMN (VPLMN).

12. The terminal of claim 11, wherein the cell selection for the cell is performed, in case that the identified Srxlev for the cell is larger than 0 and a cell selection quality value (Squal) for the cell is larger than 0.

13. A base station in a wireless communication system, the base station comprising:
a transceiver configured to transmit and receive a signal; and
a controller configured to:
generate first maximum power information and at least one second maximum power information, and
transmit, to a terminal, a system information block (SIB) including the first maximum power information and the at least one second maximum power information,
wherein a first maximum transmission power level for a cell is obtained based on the first maximum power information, and a second maximum transmission power level for the cell is obtained based on one from the at least one second maximum power information,
wherein a compensation parameter ($P_{compensation}$) associated with a cell selection reception level value (Srxlev) is identified based on the first maximum transmission power level and the second maximum transmission power level,
wherein the Srxlev for the cell is identified based on the $P_{compensation}$,
wherein a cell selection for the cell is performed based on the identified Srxlev, and
wherein the $P_{compensation}$ is identified by:

$$P_{compensation} = \max(P_{EMAX1} - P_{PowerClass}, 0) - (\min(P_{EMAX2}, P_{PowerClass}) - \min(P_{EMAX1}, P_{PowerClass})),$$

where the $P_{EMAX1}$ is the first maximum transmission power level, $P_{EMAX2}$ is the second maximum transmission power level, and the $P_{Powerclass}$ is a maximum radio frequency output power of the terminal.

14. The base station of claim 13, wherein the Srxlev is identified by subtracting a minimum required reception level in the cell ($Q_{rxlevmin}$), an offset to the $Q_{rxlevmin}$ ($Q_{rxlevminoffset}$), and the $P_{compensation}$ from a measured cell reception level value ($Q_{rxlevmeas}$).

15. The base station of claim 14, wherein the cell selection is performed as a result of a periodic search for a higher priority public land mobile network (PLMN) while camped on a visited PLMN (VPLMN).

16. The base station of claim 15, wherein the cell selection for the cell is performed, in case that the identified Srxlev for the cell is larger than 0 and a cell selection quality value (Squal) for the cell is larger than 0.

* * * * *

UNITED STATES PATENT AND TRADEMARK OFFICE
CERTIFICATE OF CORRECTION

PATENT NO. : 11,240,742 B2  
APPLICATION NO. : 17/102349  
DATED : February 1, 2022  
INVENTOR(S) : Soenghun Kim et al.

Page 1 of 1

It is certified that error appears in the above-identified patent and that said Letters Patent is hereby corrected as shown below:

In the Claims

Column 28, Claim 1, Line 1, delete "wherein the by:" and insert --wherein the--  
Column 28, Claim 5, Line 44, delete "wherein the by:" and insert --wherein the--  
Column 29, Claim 9, Line 18, delete "wherein the by:" and insert --wherein the--

Signed and Sealed this  
Thirteenth Day of June, 2023

Katherine Kelly Vidal  
*Director of the United States Patent and Trademark Office*